United States Patent
Khalid et al.

(10) Patent No.: US 10,948,982 B2
(45) Date of Patent: Mar. 16, 2021

(54) METHODS AND SYSTEMS FOR INTEGRATING VIRTUAL CONTENT INTO AN IMMERSIVE VIRTUAL REALITY WORLD BASED ON REAL-WORLD SCENERY

(71) Applicant: Verizon Patent and Licensing Inc., Arlington, VA (US)

(72) Inventors: Mohammad Raheel Khalid, Budd Lake, NJ (US); Ali Jaafar, Guttenburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/113,201

(22) Filed: Aug. 27, 2018

(65) Prior Publication Data

US 2018/0364803 A1    Dec. 20, 2018

Related U.S. Application Data

(63) Continuation of application No. 15/087,926, filed on Mar. 31, 2016, now Pat. No. 10,088,898.

(51) Int. Cl.
| | |
|---|---|
| *G06F 3/01* | (2006.01) |
| *G06T 15/00* | (2011.01) |
| *G06T 19/00* | (2011.01) |
| *G06F 3/0481* | (2013.01) |
| *G06Q 30/02* | (2012.01) |
| *G06F 3/0484* | (2013.01) |
| *G06T 19/20* | (2011.01) |
| *G06T 15/20* | (2011.01) |

(52) U.S. Cl.
CPC .......... *G06F 3/013* (2013.01); *G06F 3/04815* (2013.01); *G06F 3/04842* (2013.01); *G06Q 30/02* (2013.01); *G06T 15/005* (2013.01); *G06T 15/20* (2013.01); *G06T 19/003* (2013.01); *G06T 19/20* (2013.01); *G06F 2203/04802* (2013.01); *G06T 2219/2016* (2013.01)

(58) Field of Classification Search
None
See application file for complete search history.

(56) References Cited

U.S. PATENT DOCUMENTS

| | | |
|---|---|---|
| 5,813,011 A | 9/1998 | Yoshida et al. |
| 6,121,974 A | 9/2000 | Shaw |
| 6,366,289 B1 | 4/2002 | Johns |

(Continued)

*Primary Examiner* — Hilina K Demeter

(57) ABSTRACT

An exemplary virtual reality media system assigns a plurality of display parameters to a three-dimensional ("3D") virtual object that is to be integrated into an immersive virtual reality world. The plurality of display parameters define a time period during which the 3D virtual object is viewable within the world to a user experiencing the world, as well as a location, an orientation, and a size of the 3D virtual object as these appear to the user during the time period. The system integrates the 3D virtual object into the world in accordance with the display parameters and dynamically changes a display parameter during the time period to change the location, orientation, and/or size of the 3D virtual object. The system further integrates content into the world by presenting the content on the 3D virtual object while the display parameter is dynamically changing. Corresponding methods and systems are also disclosed.

20 Claims, 14 Drawing Sheets

(56) References Cited

U.S. PATENT DOCUMENTS

| | | |
|---|---|---|
| 8,885,882 B1 | 11/2014 | Yin et al. |
| 2004/0141650 A1 | 7/2004 | Hansson et al. |
| 2006/0274966 A1 | 12/2006 | Seki et al. |
| 2008/0204450 A1 | 8/2008 | Dawson et al. |
| 2009/0237564 A1 | 9/2009 | Kikinis et al. |
| 2010/0153868 A1 | 6/2010 | Allen et al. |
| 2012/0086727 A1 | 4/2012 | Korah et al. |
| 2012/0293394 A1 | 11/2012 | Lahcanski |
| 2012/0297014 A1 | 11/2012 | Lahcanski |
| 2014/0313225 A1 | 10/2014 | Lee et al. |
| 2015/0058102 A1* | 2/2015 | Christensen ......... H04N 13/106 705/14.6 |
| 2015/0326570 A1 | 11/2015 | Publicover et al. |
| 2015/0346832 A1* | 12/2015 | Cole ................... H04L 65/4069 345/156 |
| 2015/0348327 A1 | 12/2015 | Zalewski |
| 2015/0362733 A1* | 12/2015 | Spivack ................. G06F 3/016 345/633 |
| 2016/0018643 A1* | 1/2016 | Cho ....................... G08G 1/005 345/8 |
| 2016/0077547 A1 | 3/2016 | Aimone et al. |
| 2016/0148433 A1 | 5/2016 | Petrovskaya et al. |
| 2016/0277772 A1 | 9/2016 | Campbell et al. |
| 2016/0299563 A1 | 10/2016 | Stafford et al. |
| 2017/0076498 A1* | 3/2017 | Dakss .................... G06F 3/011 |
| 2017/0206708 A1 | 7/2017 | Gentilin et al. |

\* cited by examiner

METHODS AND SYSTEMS FOR INTEGRATING VIRTUAL CONTENT INTO AN IMMERSIVE VIRTUAL REALITY WORLD BASED ON REAL-WORLD SCENERY

RELATED APPLICATIONS

This application is a continuation application of U.S. patent application Ser. No. 15/087,926, filed Mar. 31, 2016, and entitled "Methods and Systems for Determining an Effectiveness of Content in an Immersive Virtual Reality World," which is hereby incorporated by reference in its entirety.

BACKGROUND INFORMATION

Advances in computing and networking technology have made new forms of media content possible. For example, virtual reality media content is available that may immerse viewers (or "users") into interactive virtual reality worlds that the users may experience by directing their attention to any of a variety of things being presented in the immersive virtual reality world at the same time. For example, at any time during the presentation of the virtual reality media content, a user experiencing the virtual reality media content may look around the immersive virtual reality world in any direction with respect to both a horizontal dimension (e.g., forward, backward, left, right, etc.) as well as a vertical dimension (e.g., up, down, etc.), giving the user a sense that he or she is actually present in and experiencing the immersive virtual reality world.

Because the user may direct his or her attention in any direction within the immersive virtual reality world, certain areas of the immersive virtual reality world (e.g., areas where action is occurring and/or interesting scenery or objects may be displayed) may draw the attention of the user and be viewed carefully, repeatedly, or for long periods of time by the user. In contrast, other areas of the immersive virtual reality world (e.g., areas where there is little or no action and/or interesting scenery or other objects displayed) may draw little or no attention of the user and may be generally ignored by the user. Accordingly, it may be desirable (e.g., to virtual reality media content creators, virtual reality media content providers, etc.) to determine how much of a user's attention is actually directed to particular areas of immersive virtual reality worlds. Such a determination may facilitate designing, creating, distributing, and/or otherwise improving immersive virtual reality worlds, and/or improving the experience of users within the immersive virtual reality worlds.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
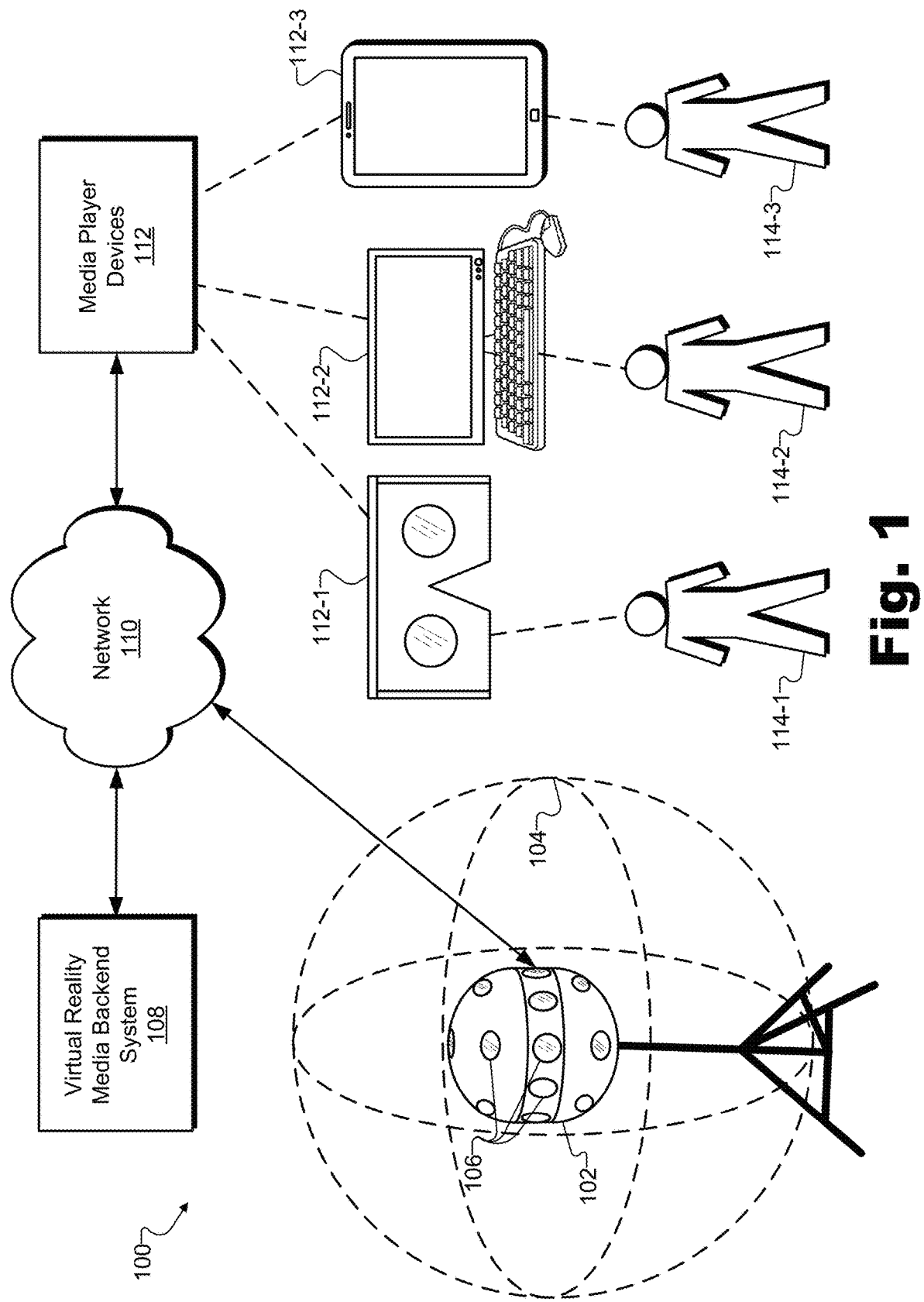
FIG. 1 illustrates an exemplary configuration in which exemplary implementations of a 360-degree camera, a virtual reality media backend system, and a media player device operate to determine an effectiveness of content in an immersive virtual reality world according to principles described herein.

Methods and systems for determining an effectiveness of content in an immersive virtual reality world are described herein. As will be described and illustrated below, a virtual reality media system may provide for display on a display screen of a media player device associated with a user, a field of view of an immersive virtual reality world. The immersive virtual reality world may be fully immersive in the sense that the user may not be presented with any image of the real world in which the user is located while the user is experiencing the immersive virtual reality world, in contrast to certain "augmented reality" technologies. However, while real-world scenery directly surrounding the user may not be presented together with the immersive virtual reality world, the immersive virtual reality world may, in certain examples, be generated based on data (e.g., image and/or audio data) representative of camera-captured real-world scenery rather than animated or computer-generated scenery of imaginary worlds such as those commonly generated for video games, animated entertainment programs, and so forth. For example, as will be described in more detail below, camera-captured real-world scenery may include real-world places (e.g., city streets, buildings, landscapes, etc.), real-world events (e.g., sporting events, large celebrations such as New Year's Eve or Mardi Gras, etc.), fictionalized live action entertainment (e.g., virtual reality television shows, virtual reality movies, etc.), and so forth.

The user may experience the immersive virtual reality world by way of the field of view. For example, the field of view may include content of the immersive virtual reality world (e.g., images depicting scenery and objects surrounding the user within the immersive virtual reality world). Additionally, the field of view may dynamically change in response to user input provided by the user as the user experiences the immersive virtual reality world. For example, the media player device may detect user input (e.g., moving or turning the display screen upon which the field of view is presented) that represents a request to shift additional content into the field of view in place of the previous content included within the field of view. In response, the field of view may display the additional content in place of the previous content. In this way, the field of view may essentially provide the user a "window" through which the user can easily and naturally look around the immersive virtual reality world.

Because the user may direct his or her attention in any direction and/or toward any content within the immersive virtual reality world, certain content included within the immersive virtual reality world (e.g., content corresponding to areas of the immersive virtual reality world where action is occurring and/or interesting scenery or objects may be displayed) may receive a relatively large amount of the attention of the user. Conversely, other content included within the immersive virtual reality world (e.g., content corresponding to areas of the immersive virtual reality world where there is little or no action and/or interesting scenery or other objects displayed) may receive a relatively small amount of the attention of the user. Accordingly, it may be desirable (e.g., to virtual reality media content creators, virtual reality media content providers, etc.) to determine an effectiveness of content within the immersive virtual reality world.

As used herein, an "effectiveness" of content may refer to an ability or a tendency of the content to draw and/or receive attention of users experiencing the immersive virtual reality world. For example, a particular object or section of scenery displayed within the immersive virtual reality world may have a high effectiveness because many users may tend to direct the field of view to look at that object or scenery. Conversely, another object or section of scenery displayed within the immersive virtual reality world may have a relatively low effectiveness because many users may be likely to not direct the field of view to look at that object or scenery very often or for a very long time.

Determining the effectiveness of particular content in an immersive virtual reality world may facilitate designing, creating, distributing, and/or otherwise improving immersive virtual reality worlds experienced by users. As one example, a virtual reality media system may integrate a commercial advertisement into an immersive virtual reality world. An effectiveness of the content of the immersive virtual reality world that includes the commercial advertisement (i.e., the "promotional effectiveness of the commercial advertisement") may be determined. Specifically, the promotional effectiveness of the commercial advertisement may indicate how well the content of the commercial advertisement serves a promotional purpose of the commercial advertisement (e.g., how likely users are to direct attention to the content). For example, the commercial advertisement may be presented on an outer surface of a virtual object integrated into the immersive virtual reality world. In certain examples, the virtual object may be used primarily as a platform for inserting promotional content into the immersive virtual reality world, while in other examples the virtual object may add value to the immersive virtual reality world beyond the promotional function of the virtual object. Commercial advertisements and virtual objects upon which the commercial advertisements may be presented will be described in more detail below.

The virtual reality media system may detect that a gaze of the user (e.g., the attention of the user based on where the user is looking) is directed at the commercial advertisement integrated within the immersive virtual reality world while the commercial advertisement is included within the field of view. For example, as will be described in more detail below, the virtual reality media system may determine or track the gaze of the user by using a gaze reticle persistently centered within the field of view, by tracking eye movements of the user (e.g., detecting and tracking an angle at which the retinas of the user's eyes are directed) to precisely determine which area of the field of view the user is viewing, by tracking movement of a controller associated with the media player device (e.g., a ring controller, a wearable controller, a handheld controller, etc.), by using raytracing techniques, or by using any other suitable technique that may serve a particular embodiment. Once the virtual reality media system has detected that the gaze of the user is directed at the commercial advertisement, the virtual reality media system may also track an amount of time that the gaze of the user is directed at the commercial advertisement.

Based on the amount of time that the gaze of the user is determined to be directed at the commercial advertisement, the virtual reality media system may generate reportable analytics data for the commercial advertisement with respect to the user, referred to herein as promotional effectiveness data. For example, the promotional effectiveness data may include data related to a number of times the user viewed the commercial advertisement, an amount of time the user spent viewing the advertisement in a particular instance, a total amount of time the user spent viewing the advertisement, whether a supplemental action (e.g., playback of a video associated with the commercial advertisement) was triggered based on the length of time that the user viewed the advertisement, and so forth. Profile data (e.g., demographic data, personal data, etc.) related to the user may be incorporated into the promotional effectiveness data. Moreover, the promotional effectiveness data with respect to the user may be aggregated with promotional effectiveness data with respect to a plurality of other users. Examples of promotional effectiveness data and how promotional effectiveness data may be generated will be provided below.

Subsequent to generating and/or aggregating the promotional effectiveness data, in certain examples the virtual reality media system may provide the promotional effectiveness data to a billing system configured to bill a commercial sponsor associated with the commercial advertisement. For example, the billing system may be configured to automatically bill the commercial sponsor by charging an advertising fee and/or receiving a payable amount from an account of the commercial sponsor based on the promotional effectiveness of the commercial advertisement. In other words, if the promotional effectiveness data reveals that the commercial advertisement reached at least a certain predetermined level of effectiveness for a particular user or set of users, the billing system may be configured to bill the commercial sponsor a higher amount than if the promotional effectiveness data reveals that the commercial advertisement did not reach the predetermined level of effectiveness for the particular user or set of users.

Accordingly, determining promotional effectiveness of commercial advertisements in an immersive virtual reality world as described herein may provide significant advantages to both virtual reality media content providers and to commercial sponsors paying to integrate commercial advertisements into the virtual reality media content. In particular, both parties may benefit from fair and/or accurate pricing models for advertisements integrated into virtual reality media content because providers may receive more advertising revenue when virtual reality media content successfully facilitates the promotion of the sponsors' products and/or services, and the amount that sponsors are billed for advertising may be directly proportional to the promotional effectiveness of the advertising. To the extent that promotional effectiveness is determined in relation to specific users and their interests and/or purchasing habits, the users may also benefit by being presented with more relevant advertising, a lower volume of advertising, and/or higher quality virtual reality media content supported by effective advertising.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary configuration 100 in which exemplary embodiments of a 360-degree camera, a virtual reality media backend system, and one or more media player devices operate to determine an effectiveness of content (e.g., promotional effectiveness of commercial advertisements) in an immersive virtual reality world. As shown in FIG. 1, a 360-degree camera 102 ("camera 102") may capture and/or generate a 360-degree image of real-world scenery 104 around a center point corresponding to camera 102. For example, camera 102 may capture a plurality of images from each of a plurality of segment capture cameras 106 built into or otherwise associated with camera 102, and may generate the 360-degree image of real-world scenery 104 by combining the plurality of images captured by segment-capture cameras 106.

Camera 102 may capture data representative of 360-degree images of real-world scenery 104 and transmit the data to a virtual reality media backend system 108 ("backend system 108") by way of a network 110. After preparing and/or processing the data representative of the 360-degree images to generate an immersive virtual reality world based on the 360-degree images, backend system 108 may transmit data representative of the immersive virtual reality world to one or more media player devices 112 such as a head-mounted virtual reality device 112-1, a personal computer device 112-2, a mobile device 112-3, and/or to any other form factor of media player device that may serve a particular implementation. Regardless of what form factor media player devices 112 take, users 114 (e.g., users 114-1 through 114-3) may experience the immersive virtual reality world by way of media player devices 112. Each of the elements of configuration 100 will now be described in detail.

Camera 102 may be set up and/or operated by a virtual reality content creator and may include any type of camera that is configured to capture data representative of a 360-degree image of real-world scenery 104 around a center point corresponding to camera 102. As used herein, a 360-degree image is any still or video image that depicts the surroundings (e.g., real-world scenery 104) of a center point (e.g., a center point associated with the location of camera 102) on all sides along at least one dimension. For example, one type of 360-degree image may include a panoramic image that depicts a complete 360-degree by 45-degree ring around a center point corresponding to a camera (e.g., camera 102). Another type of 360-degree image may include a spherical image that depicts not only the ring around the center point, but an entire 360-degree by 180-degree sphere surrounding the center point on all sides. In certain examples, a 360-degree image may be based on a non-circular geometric structure. For example, certain 360-degree images may be based on cubes, rectangular prisms, pyramids, and/or other geometric structures that may serve a particular implementation, rather than being based on spheres.

Camera 102 may be configured to capture the data representative of the 360-degree image of real-world scenery 104 in any way that may serve a particular implementation. For example, as shown in FIG. 1, camera 102 may capture various segments of real-world scenery 104 using segment capture cameras 106, which may each capture an image of a single segment of real-world scenery 104 that may be combined (e.g., stitched together) with other segments to generate the 360-degree image of real-world scenery 104. In certain examples, segment capture cameras 106 may each represent a single camera unit (e.g., including a lens and suitable image capture hardware) built into a single 360-degree camera configured to capture 360-degree images. In other examples, camera 102 may include an array of segment capture cameras 106 that are each a single, standalone camera configured to capture standard images (e.g., images depicting less than a 360-degree view) that may later be combined to form the 360-degree image. In yet other examples, camera 102 may include one or more "fish-eye" lenses configured to capture a very wide-angle image (e.g., a spherical image or a semi-spherical image) that can be used as the 360-degree image or processed to generate the 360-degree image. Alternatively, camera 102 may include a single, standard camera that captures and/or combines a plurality of still images of real-world scenery 104 taken at different points in time (e.g., using a "panorama mode" of the camera or a similar feature) to capture still 360-degree images. In certain examples, camera 102 may include one or more stereoscopic cameras. Camera 102 may also use any combination of the 360-degree image capture techniques described above or any other capture techniques that may serve a particular implementation.

Subsequent to capturing raw image data representative of real-world scenery 104, camera 102 may generate from the raw image data a 360-degree image of real-world scenery 104. For example, camera 102 may be configured to automatically process the raw image data (e.g., by combining a plurality of images captured by segment capture cameras 106, by processing images captured by a fish-eye lens, etc.) to form the 360-degree image, and then may transmit data representative of the 360-degree image to backend system 108. Alternatively, camera 102 may be configured to transmit the raw image data directly to backend system 108, and any processing and/or combining of the raw image data may be performed within backend system 108.

Camera 102 may capture any real-world scenery 104 that may serve a particular embodiment. For example, real-world scenery 104 may include any indoor or outdoor real-world location such as the streets of a city, a museum, a scenic landscape, a satellite orbiting and looking down upon the Earth, the surface of another planet, or the like. Real-world scenery 104 may further include certain events such as a stock car race, a football game or other sporting event, a large-scale party such as New Year's Eve on Times Square in New York City, or other events that may interest potential users. In certain examples, real-world scenery 104 may be a setting for a fictionalized event, such as a set of a live-action virtual reality television show or movie.

In some implementations, capturing real-world scenery 104 using camera 102 may be optional. For example, a 360-degree image of scenery surrounding a center point may be completely computer-generated (e.g., animated) based on models of an imaginary world rather than captured from real-world scenery 104 by camera 102. As such, camera 102 may be omitted in certain examples.

Backend system 108 may be associated with (e.g., provided and/or managed by) a virtual reality media content service provider (e.g., a network service provider, a cable service provider, a satellite service provider, an Internet service provider, a provider of virtual reality mobile applications, etc.) and may be configured to provide virtual reality media content to users (e.g., subscribers of a virtual reality media content service, users who download or otherwise acquire virtual reality mobile applications, etc.) by way of media player devices 112. To this end, backend system 108 may receive, generate, process, and/or maintain data representative of virtual reality media content. For example, backend system 108 may be configured to receive camera-captured data (e.g., video data captured by camera 102) representative of a 360-degree image of real-world scenery 104 around a center point corresponding to camera 102. If the camera-captured data is raw image data (e.g., image data captured by each of segment capture cameras 106 that has not been combined into a 360-image), backend system 108 may unwrap, combine (i.e., stitch together), or otherwise process the raw image data to form the 360-degree image representative of real-world scenery 104.

Based on the camera-captured data representative of real-world scenery 104 (e.g., the 360-degree image), backend system 108 may generate and maintain an immersive virtual reality world (i.e., data representative of an immersive virtual reality world that may be experienced by a user). For example, backend system 108 may generate a three-dimensional ("3D") model of the immersive virtual reality world where virtual objects may be presented along with projections of real-world scenery 104 to a user experiencing the immersive virtual reality world. To generate the immersive virtual reality world, backend system 108 may perform video transcoding, slicing, orchestration, modeling, and/or any other processing that may serve a particular embodiment.

Subsequent to or concurrent with generating one or more immersive virtual reality worlds associated with one or more virtual reality media content instances (also referred to herein as "virtual reality media content programs"), backend system 108 may provide access to the virtual reality media content programs for users such as subscribers of a virtual reality media content service operated by the virtual reality media content provider and/or users who download or otherwise acquire virtual reality mobile applications provided by the virtual reality media content provider. To this end, backend system 108 may present a field of view of the immersive virtual reality world to users by way of media player devices 112 in response to requests from media player devices 112 to access the virtual reality media content. For example, as will be described in more detail below, backend system 108 may present the field of view by transmitting data representative of content of the immersive virtual reality world (e.g., virtual objects within the immersive virtual reality world, images of real-world scenery 104, etc.) to media player devices 112, which may render the data to display the content on their screens. Examples of immersive virtual reality worlds, fields of view of immersive virtual reality worlds, and virtual objects presented along with projections of real-world scenery 104 within immersive virtual reality worlds will be described below.

Camera 102, backend system 108, and media player devices 112 may communicate with one another using any suitable communication technologies, devices, media, and/or protocols supportive of data communications, including, but not limited to, socket connections, Ethernet, data bus technologies, data transmission media, communication devices, Transmission Control Protocol ("TCP"), Internet Protocol ("IP"), File Transfer Protocol ("FTP"), Telnet, Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), Voice over IP ("VoIP"), Voice over LTE ("VoLTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Network 110 may include any provider-specific network (e.g., a cable or satellite carrier network or a mobile telephone network), the Internet, wide area network, or any other suitable network. Data may flow between camera 102, backend system 108, and media player devices 112 by way of network 110 using any communication technologies, devices, media, and protocols as may serve a particular implementation. While only one network 110 is shown to interconnect camera 102, backend system 108, and media player devices 112 in FIG. 1, it will be recognized that these devices and systems may intercommunicate by way of multiple interconnected networks as may serve a particular implementation.

Media player devices 112 (i.e., head-mounted virtual reality device 112-1, personal computer device 112-2, and mobile device 112-3) may be used by users 114 (i.e., users 114-1 through 114-3) to access and experience virtual reality media content received from backend system 108. To this end, media player devices 112 may each include or be implemented by any device capable of presenting a field of view of an immersive virtual reality world and detecting user input from a user (e.g. one of users 114) to dynamically change the content within the field of view as the user experiences the immersive virtual reality world. For example, media player devices 112 may include or be implemented by a head-mounted virtual reality device (e.g., a virtual reality gaming device), a personal computer device (e.g., a desktop computer, laptop computer, etc.), a mobile or wireless device (e.g., a smartphone, a tablet device, a mobile reader, etc.), or any other device or configuration of devices that may serve a particular implementation to facilitate receiving and/or presenting virtual reality media content. As will be described in more detail below, different types of media player devices 112 (e.g., head-mounted virtual reality devices, personal computer devices, mobile devices, etc.) may provide different types of virtual reality experiences having different levels of immersiveness for users 114.

Media player devices 112 may be configured to allow users 114 to select respective virtual reality media content programs that users 114 may wish to experience on their respective media player devices 112. In certain examples, media player devices 112 may download virtual reality media content programs that users 114 may experience offline (e.g., without an active connection to backend system 108). In other examples, media player devices 112 may request and receive data streams representative of virtual reality media content programs that users 114 experience while media player devices 112 remain in active communication with backend system 108 by way of network 110.

To facilitate users 114 in experiencing virtual reality media content, each of media player devices 112 may include or be associated with at least one display screen upon which a field of view of an immersive virtual reality world may be presented. Media player devices 112 may also include software configured to receive, maintain, and/or process data representative of the immersive virtual reality world to present content of the immersive virtual reality world within the field of view on the display screens of the media player devices. For example, media player devices 112 may include dedicated, standalone software applications (e.g., mobile applications) configured to process and present data representative of immersive virtual reality worlds on the displays. In other examples, the software used to present the content of the immersive virtual reality worlds may include non-dedicated software such as standard web browser applications.

Figure 2:
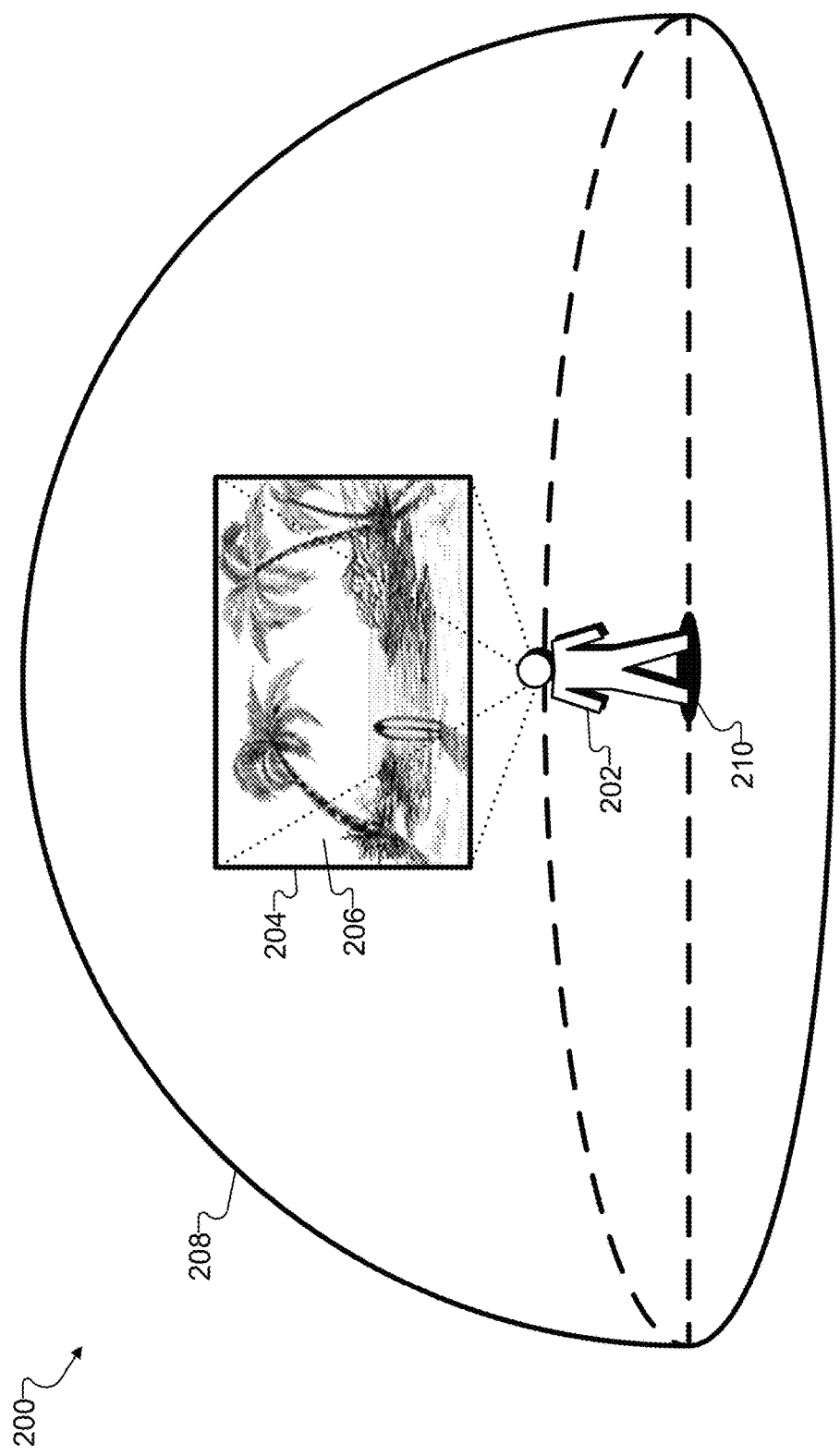
FIG. 2 illustrates an exemplary virtual reality experience in which a user is presented with an exemplary field of view that includes content of an exemplary immersive virtual reality world according to principles described herein.

FIG. 2 illustrates an exemplary virtual reality experience 200 in which a user 202 is presented with an exemplary field of view 204 that includes content 206 of an exemplary immersive virtual reality world 208. User 202 may experience immersive virtual reality world 208 ("world 208") by providing user input to dynamically change field of view 204 to display whatever content within world 208 that user 202 wishes to view. For example, the user input provided by user 202 may include an indication that user 202 wishes to look at content not currently presented within field of view 204 (i.e., content of world 208 other than content 206). For media player devices 112 such as personal computer 112-2 and/or mobile device 112-3, this user input may include a mouse movement, navigation key input from a keyboard, a swipe gesture, or the like. For media player devices 112 incorporating particular sensors (e.g., motion, directional, and/or orientation sensors) such as head-mounted virtual reality device 112-1 and/or mobile device 112-3, however, this user input may include a change to an orientation of the display screen of the media player device 112 with respect to at least one axis of at least two orthogonal axes. For example, the media player device may be configured to sense changes in orientation of the display screen with respect to an x-axis, a y-axis, and a z-axis that are all orthogonal to one another. As such, the media player device 112 may be configured to detect the change to the orientation of the display screen as user 202 experiences world 208, and the dynamic changing of the content includes gradually replacing content 206 with other content of world 208 that is determined to be visible from a viewpoint of user 202 within world 208 according to the detected change to the orientation of the display screen with respect to the at least one axis.

To illustrate, FIG. 2 shows that content 206 may include real-world scenery depicting a beach with palm trees and a surfboard. User 202 may provide user input to a media player device by which user 202 is experiencing world 208 (e.g., one of media player devices 112) to indicate that user 202 wishes to look at content to the left of content 206 currently included within field of view 204. For example, user 202 may press a left navigation key on a keyboard, perform a swipe gesture to the right, or change the orientation of the display screen with respect to a y-axis by rotating his or her head to the left while wearing a head-mounted device. In response, the real-world scenery (i.e., the palm trees, the surfboard, etc.) may scroll to the right across field of view 204 to give user 202 a sensation that he or she is turning to look to the left in world 208. As content 206 scrolls off the right side of field of view 204, new content (not explicitly shown in FIG. 2) smoothly scrolls onto the left side of field of view 204. In this way, user 202 may provide user input to cause field of view 204 to present any part of world 208 that user 202 desires.

In FIG. 2, world 208 is illustrated as a semi-sphere, indicating that user 202 may look in any direction that is substantially forward, backward, left, right, and/or up. However, if user 202 directs field of view 204 down, world 208 may not include dynamic and/or real-world scenery content to be presented within field of view 204. For example, if world 208 includes a dynamic immersive virtual reality world (i.e., using a 360-degree video image), field of view 204 may present a still image representative of the ground of world 208. In other examples, field of view 204 may present nothing (i.e., a black screen), a menu, one or more virtual objects, or any other suitable image that may serve a particular implementation. In other examples, world 208 may include an entire 360-degree by 180-degree sphere so that every direction in which user 202 may direct field of view 204 is associated with dynamic and/or real-world content of world 208.

As shown in FIG. 2, world 208 may appear to surround a center point 210 associated with user 202. In some embodiments, center point 210 may correspond to a location of a camera (e.g., camera 102) used to capture the content of world 208 (e.g., including content 206). As such, center point 210 may be static or may move through world 208 in a way that user 202 is unable to control (e.g. moving through world 208 in a same manner as camera 102 moved through real-world scenery 104 during the creation of the virtual reality media content). In other embodiments, user 202 may be able to provide input to modify where center point 210 is located within world 208. For example, user 202 may hop from one center point to another (e.g., corresponding to where each of a plurality of 360-degree cameras captured 360-degree images) within world 208 or cause center point 210 to move continuously within world 208. While center point 210 is illustrated at the feet of user 202 for simplicity of illustration, it will be understood that center point 210 may actually be located at the eye level of user 202.

Figure 3:
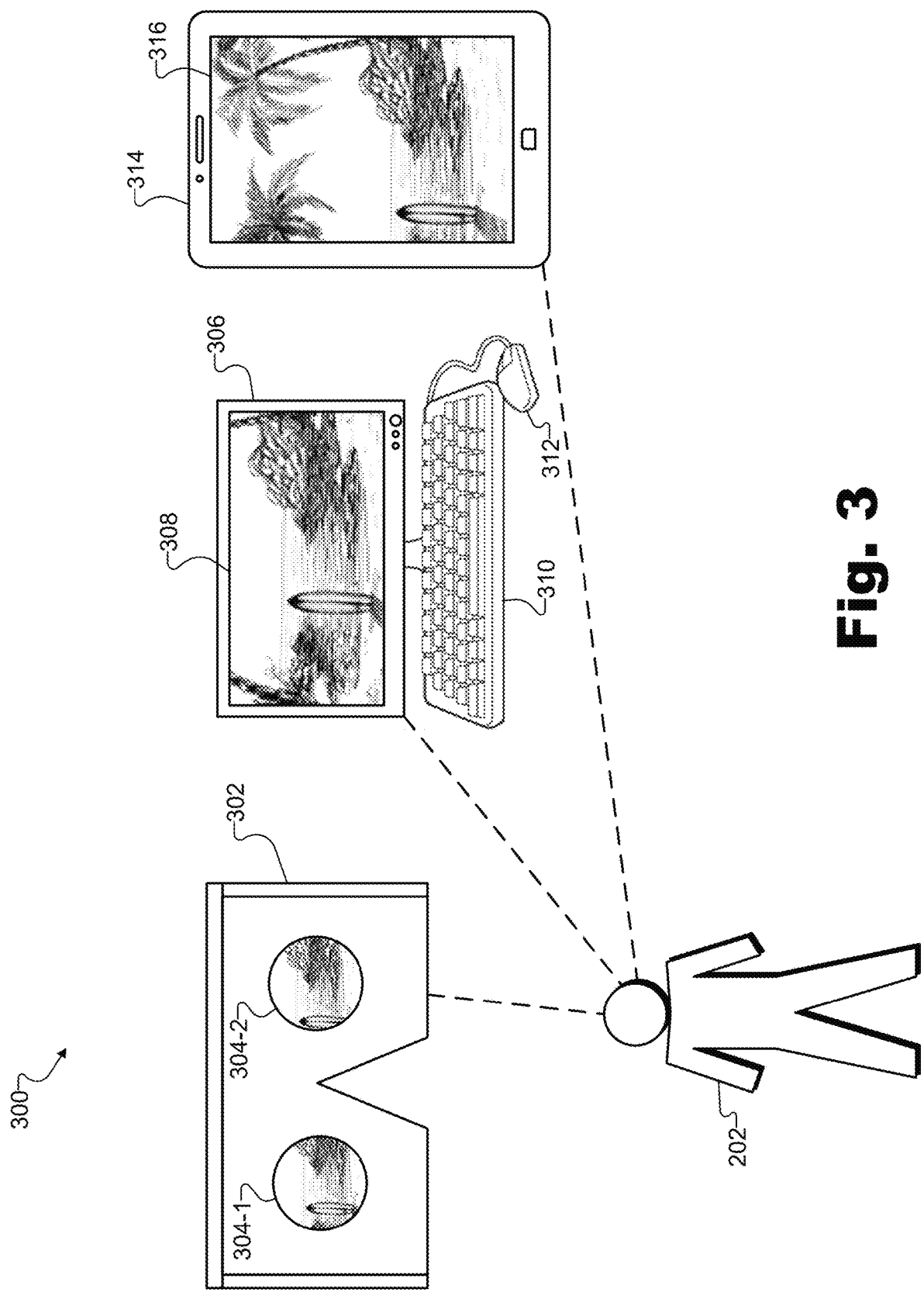
FIG. 3 illustrates exemplary media player devices configured to facilitate experiencing the immersive virtual reality world of FIG. 2 by a user according to principles described herein.

As mentioned above, different types of media player devices may provide different experiences for user 202 by presenting field of view 204 of world 208 in different ways, by receiving user input from user 202 in different ways, and so forth. To illustrate, FIG. 3 shows exemplary media player devices 300 configured to facilitate experiencing of world 208 by user 202. Media player devices 300 may correspond to media player devices 112, described above in relation to FIG. 1.

As one example, a head-mounted virtual reality device 302 may be mounted on the head of user 202 and arranged so that each of the eyes of user 202 sees a distinct display screen 304 (e.g., display screens 304-1 and 304-2) within head-mounted virtual reality device 302. In some examples, a single display screen 304 may be presented and shared by both eyes of user 202. In other examples, as shown, distinct display screens 304 within head-mounted virtual reality device 302 may be configured to display slightly different versions of field of view 204 (e.g., stereoscopic versions of field of view 204 that may be captured by one or more stereoscopic cameras) to give user 202 the sense that world 208 is three-dimensional. Display screens 304 may also be configured to display content 206 such that content 206 fills the peripheral vision of user 202, providing even more of a sense of realism to user 202. Moreover, head-mounted virtual reality device 302 may include motion sensors (e.g., accelerometers), directional sensors (e.g., magnetometers), orientation sensors (e.g., gyroscopes), and/or other suitable sensors to detect natural movements (e.g., head movements) of user 202 as user 202 experiences world 208. Thus, user 202 may provide input indicative of a desire to move field of view 204 in a certain direction and by a certain amount in world 208 by simply turning his or her head in that direction and by that amount. As such, head-mounted virtual reality device 302 may provide user 202 with a natural and hands-free experience that does not require any physical console control to experience the immersive virtual reality world and that may be the most immersive virtual reality experience provided by any type of media player device.

As another example of a media player device, a personal computer device 306 having a display screen 308 (e.g., a monitor) may be used by user 202 to experience world 208. Because display screen 308 may not provide the distinct stereoscopic view for each of the user's eyes and/or may not fill the user's peripheral vision, personal computer device 306 may not provide the same degree of immersiveness that head-mounted virtual reality device 302 provides. However, personal computer device 306 may be associated with other advantages such as its ubiquity among casual virtual reality users that may not be inclined to purchase or use a head-mounted virtual reality device. In some examples, personal computer device 306 may allow a user to experience virtual reality content within a standard web browser so that user 202 may conveniently experience world 208 without using special devices or downloading special software. User 202 may provide user input to personal computer device 306 by way of a keyboard 310 (e.g., using navigation keys on keyboard 310 to move field of view 204) and/or by way of a mouse 312 (e.g., by moving mouse 312 to move field of view 204). In certain examples, a combination of keyboard 310 and mouse 312 may be used to provide user input such as by moving field of view 204 by way of navigation keys on keyboard 310 and clicking or otherwise interacting with objects within world 208 by way of mouse 312.

As yet another example of a media player device, a mobile device 314 having a display screen 316 may be used by user 202 to experience world 208. Mobile device 314 may incorporate certain advantages of both head-mounted virtual reality devices and personal computer devices to provide the most versatile type of media player device for experiencing world 208. Specifically, like personal computer devices, mobile devices are extremely ubiquitous, potentially providing access to many more people than dedicated head-mounted virtual reality devices. However, because many mobile devices are equipped with motion sensors, directional sensors, orientation sensors, etc., mobile devices may also be configured to provide user 202 with an immersive experience comparable to that provided by head-mounted virtual reality devices. For example, mobile device 314 may be configured to divide display screen 316 into two versions (e.g., stereoscopic versions) of field of view 204 and to present content 206 to fill the peripheral vision of user 202 when mobile device 314 is mounted to the head of user 202 using a relatively inexpensive and commercially-available mounting apparatus (e.g., a cardboard apparatus). In other embodiments, mobile device 314 may facilitate experiencing world 208 by receiving movement-based user input at arm's length (i.e., not mounted to the head of user 202 but acting as a hand-held dynamic window for looking around world 208), by receiving swipe gestures on a touchscreen, or by other techniques that may serve a particular embodiment.

Figure 4:
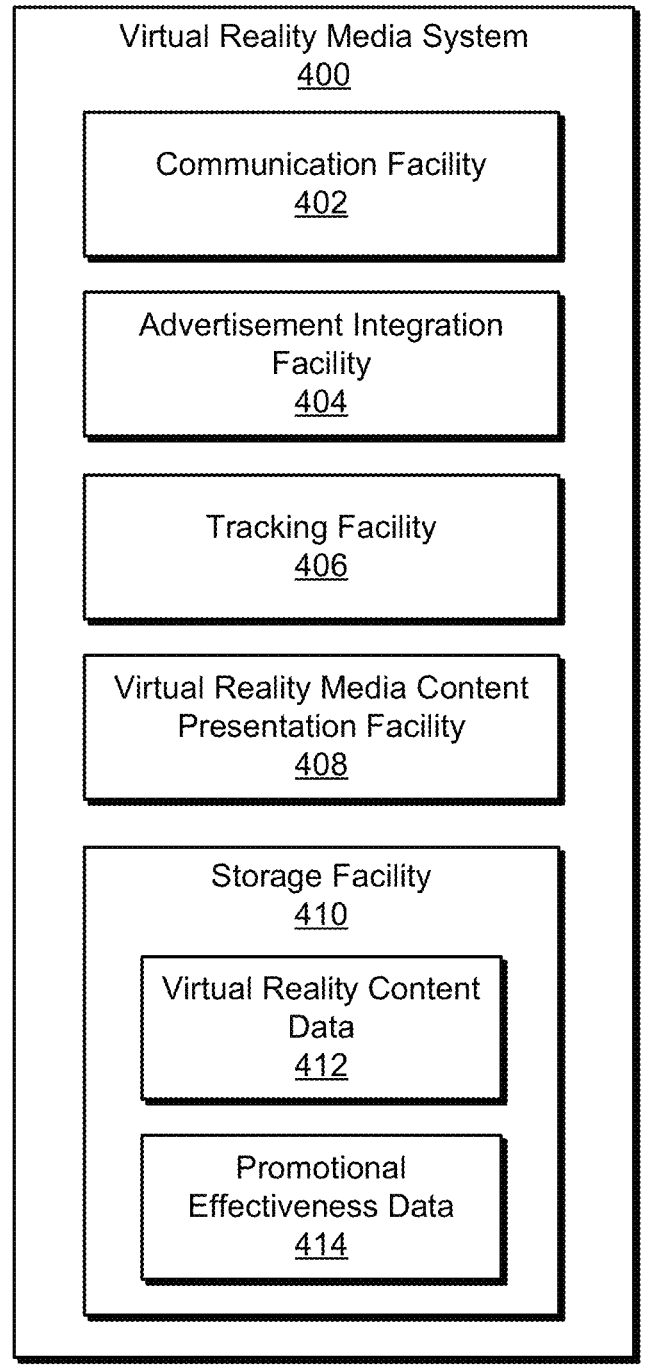
FIG. 4 illustrates an exemplary virtual reality media system configured to determine an effectiveness of content in an immersive virtual reality world according to principles described herein.

FIG. 4 illustrates an exemplary virtual reality media system 400 ("system 400") configured to determine an effectiveness of content (e.g., promotional effectiveness of commercial advertisements) in an immersive virtual reality world. As shown, system 400 may include, without limitation, a communication facility 402, an advertisement integration facility 404, a tracking facility 406, a virtual reality media content presentation facility 408, and a storage facility 410 selectively and communicatively coupled to one another. It will be recognized that although facilities 402-410 are shown to be separate facilities in FIG. 4, any of facilities 402-410 may be combined into fewer facilities, such as into a single facility, or divided into more facilities as may serve a particular implementation.

While examples of certain media player devices have been described, the examples are illustrative and not limiting. A media player device may include any suitable device and/or configuration of devices configured to facilitate receipt and presentation of virtual reality media content according to principles described herein. For example, a media player device may include a tethered device configuration (e.g., a tethered headset device) or an untethered device configuration (e.g., a display screen untethered from a processing device). As another example, a head-mounted virtual reality media player device or other media player device may be used in conjunction with a virtual reality controller such as a wearable controller (e.g., a ring controller) and/or a handheld controller.

System 400 may be implemented by or may include one or more devices and/or systems of configuration 100, described above in relation to FIG. 1. For example, system 400 may be implemented entirely by backend system 108, entirely by one of media player devices 112, or by any combination of backend system 108 and a media player device 112 that may serve a particular implementation. In certain embodiments, camera 102, components of network 110, and/or one or more other computing devices (e.g., servers) remote from and communicatively coupled to media player devices 112 by way of network 110 may also serve to implement at least certain components and/or operations of system 400. As will be described in more detail below, system 400 may be used to present field of view 204 of world 208 (described above in relation to FIG. 2) within a display screen of a media player device (e.g., any of the media player devices described herein).

Storage facility 410 may maintain virtual reality content data 412 and/or promotional effectiveness data 414 generated, received, transmitted, and/or used by communication facility 402, advertisement integration facility 404, tracking facility 406, and/or virtual reality media content presentation facility 408.

For example, virtual reality content data 412 may include data representative of content of world 208 (e.g., data representative of one or more 360-degree images that include content 206 shown in FIG. 2), data representative of one or more commercial advertisements associated with one or more commercial sponsors, data representative of one or more virtual objects that may be presented within world 208 (e.g., each having one of the commercial advertisements presented on an outer surface of the virtual object), data representative of display parameters assigned to each of the commercial advertisements and/or to each of the virtual objects, and/or data used to facilitate mapping each commercial advertisement onto an outer surface of each virtual object such that the commercial advertisement is viewable as a skin of the virtual object when the outer surface of the virtual object is located within field of view 204 of world 208. Virtual reality content data 412 may further include data representative of an area of world 208 currently being presented within field of view 204, data used to track the location of field of view 204, data used to track a gaze of user 202 (i.e., to determine whether user 202 is looking at a commercial advertisement presented within field of view 204), data used to track an amount of time that the gaze of the user is directed at one or more commercial advertisements, data used to present and/or render content to be presented within field of view 204, and/or any other data that may serve a particular implementation.

Promotional effectiveness data 414 may include data representative of an amount of time that a gaze of user 202 is directed at a commercial advertisement, a number of separate instances that the gaze of user 202 has been directed at the commercial advertisement, whether a supplemental action associated with the commercial advertisement has been triggered based on the amount of time that the gaze of user 202 is directed at the commercial advertisement, which supplemental actions associated with the commercial advertisement have been triggered, and/or profile data related to user 202. Promotional effectiveness data 414 may further include an aggregation of these or any other suitable data related to user 202 and to a plurality of other users experiencing world 208. Examples of promotional effectiveness data and aggregated promotional effectiveness data will be described in more detail below.

Communication facility 402 may perform any suitable communication operations for proper functionality of system 400. For example, as will be described in more detail below, communication facility 402 may access a commercial advertisement (e.g., by requesting and receiving data representative of the commercial advertisement from a sponsor or from a third-party advertisement exchange service system). Moreover, communication facility 402 may receive or transmit data representative of world 208 and commercial advertisements integrated into world 208 to facilitate virtual reality media content presentation facility 408 in providing field of view 204 for display on the display screen of one of media player devices 112.

For example, in an embodiment where system 400 is entirely implemented by backend system 108, communication facility 402 may facilitate providing field of view 204 for display on the display screen by transmitting data representative of field of view 204 and/or commercial advertisements integrated into world 208 to one of media player devices 112. Conversely, in an implementation where system 400 is entirely implemented by a media player device (e.g., one of media player devices 112 or 300), communication facility 402 may facilitate providing field of view 204 for display on the display screen by receiving data representative of content of world 208 and/or the integrated commercial advertisements within world 208 from backend system 108.

Additionally, communication facility 402 may be configured to provide promotional effectiveness data (e.g., promotional effectiveness data 414 generated by tracking facility 406) to a billing system configured to bill a commercial sponsor associated with the commercial advertisement based on the promotional effectiveness data, as will be described below.

Advertisement integration facility 404 may perform any suitable operations for integrating commercial advertisements into world 208. For example, as will be described in more detail below, advertisement integration facility 404 may map a commercial advertisement onto an outer surface of a virtual object such that the commercial advertisement appears as a skin of the virtual object. Advertisement integration facility 404 may integrate the virtual object upon which the commercial advertisement is presented into world 208. To this end, object integration facility 404 may facilitate generating world 208 based on data representative of a 360-degree image (e.g., of camera-captured real-world scenery 104) by assigning display parameters (e.g., positional parameters, orientational parameters, scaling parameters, time parameters, etc.) to commercial advertisements and/or to virtual objects (e.g., virtual objects displaying commercial advertisements on the outer surfaces of the virtual objects) in order to determine how and when the commercial advertisements and/or virtual objects are to be presented within world 208. Examples of such display parameters will be described below.

Tracking facility 406 may perform any suitable tracking operations for proper functionality of system 400. For example, as will be described in more detail below, tracking facility 406 may receive user input (e.g., from user 202) representative of dynamic changes user 202 wishes to make to field of view 204, and may track a current position within world 208 of field of view 204 based on the user input. Tracking facility 406 may further track a gaze of user 202 based on the same user input and/or based on additional user input such as eye-tracking user input detected based on where the eyes of user 202 are looking. In particular, tracking facility 406 may detect that the gaze of user 202 is directed at a commercial advertisement included within field of view 204 and may track an amount of time the gaze of user 202 is directed at the commercial advertisement. Based on the amount of time that the gaze of user 202 is determined to be directed at the commercial advertisement, tracking facility 406 may generate promotional effectiveness data 414, which may be provided (e.g., by communication facility 402) to a billing system configured to bill the commercial sponsor associated with the commercial advertisement based on the promotional effectiveness data.

Virtual reality media content presentation facility 408 may perform any suitable image presentation and/or rendering operations for proper functionality of system 400. For example, as will be described in more detail below, virtual reality media content presentation facility 408 may provide field of view 204 of world 208 for display on a display screen of one of media player devices 300 (e.g., display screens 304 of head-mounted virtual reality device 302, display screen 308 of personal computer device 306, or display screen 316 of mobile device 314). In providing field of view 204 for display, virtual reality media content presentation facility 408 may continuously and dynamically change (i.e., re-render and update) content presented within field of view 204 in response to user input provided by user 202 (e.g., as detected by tracking facility 406) while user 202 experiences world 208. Additionally, virtual reality media content presentation facility 408 may present within field of view 204 one or more commercial advertisements and/or virtual objects that have been integrated into world 208 (e.g., by advertisement integration facility 404). Examples of fields of view of immersive virtual reality worlds will be described below, including examples in which content of the immersive virtual reality world is presented that includes commercial advertisements mapped onto the outer surfaces of the virtual objects.

Figure 5:
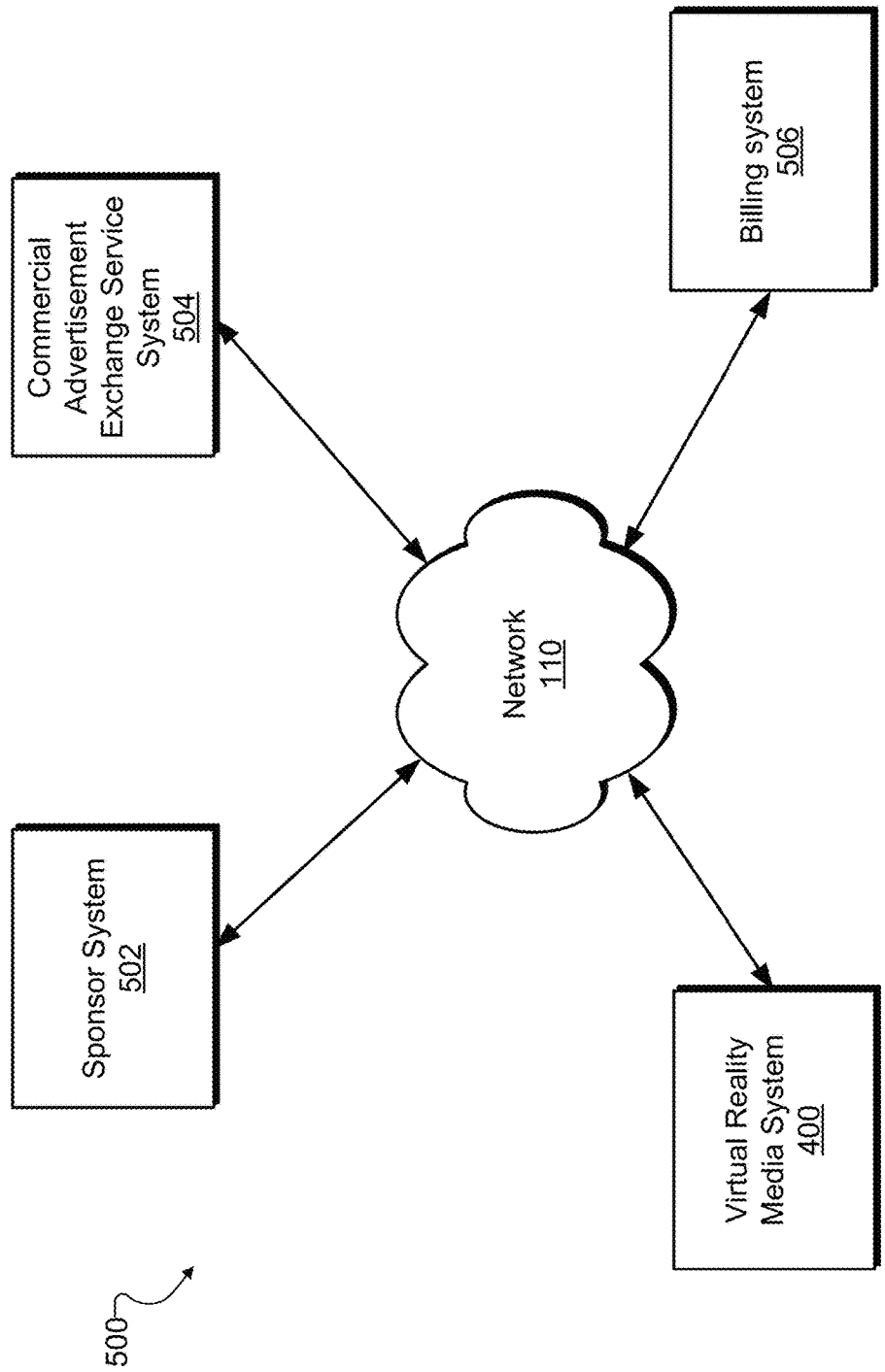
FIG. 5 illustrates an exemplary configuration where the virtual reality media system of FIG. 4 is in communication with other systems and/or devices to determine and use an effectiveness of content in an immersive virtual reality world according to principles described herein.

FIG. 5 illustrates an exemplary configuration 500 where system 400 is in communication (i.e., via network 110 described above in relation to FIG. 1) with other systems to determine and use an effectiveness of content (e.g., promotional effectiveness of commercial advertisements) in an immersive virtual reality world. In particular, configuration 500 shows system 400 along with a sponsor system 502, a commercial advertisement exchange service system 504, and a billing system 506 communicatively coupled to one another and to system 400 via network 110. As described above, system 400 may be implemented entirely by backend system 108, entirely by one or more of media player devices 112, or by a combination of backend system 108, media player devices 112, and/or other suitable computing devices as may serve a particular implementation.

Either or both of sponsor system 502 and commercial advertisement exchange service system 504 may be used by system 400 to access data representative of commercial advertisements that system 400 may insert into an immersive virtual reality world such as world 208. For example, in certain implementations, sponsor system 502 may include a computing system associated with a sponsor (e.g., a commercial sponsor such as a company promoting goods and/or services, a nonprofit sponsor promoting a charitable cause, a public interest sponsor promoting political ideas and/or a particular candidate for a political office, etc.) that is providing support for world 208 and/or a virtual reality media content program with which world 208 is associated.

In return for providing the support, the sponsor associated with sponsor system 502 may use world 208 and/or the virtual reality media content program associated with world 208 as an advertising platform for promoting products and/or services that the sponsor offers. For example, the sponsor may provide commercial advertisements that can be presented to users before, after, or while the users experience world 208. In certain examples, the sponsor may provide commercial advertisements that include virtual reality content configured to be presented within or along with world 208, or commercial advertisements that include a separate immersive virtual reality world that may be presented to user 202 in place of world 208 before world 208 is presented (e.g., as a pre-roll ad), after world 208 is presented (e.g., as a post-roll ad), and/or during a commercial break while world 208 is being presented (e.g., as a mid-roll ad). In other examples, the sponsor may provide two-dimensional ("2D") commercial advertisements such as still or animated banner ads, videos (e.g., television-style commercial spots), and/or other 2D commercial advertisements that may serve a particular embodiment.

Commercial advertisement exchange service system 504 may be operated by a third party (e.g., a party that is neither the virtual reality media content provider associated with system 400 nor the sponsor associated with sponsor system 502) to facilitate the pairing of sponsors interested in placing commercial advertisements and media content providers that control advertising platforms on which commercial advertising campaigns may be effectively implemented (e.g., a media content provider that controls virtual reality media content viewed by large numbers of people). For example, well-known companies like GOOGLE, YAHOO, AOL, and others may operate commercial advertisement exchange services to facilitate distribution of advertisements for integration with web content on the Internet. In some examples, commercial advertisement exchange services may be largely or exclusively configured to distribute traditional, 2D promotional material. For example, commercial advertisement exchange services may provide commercial advertisements configured to be displayed as banner ads, pop-up ads, television-style commercial spots (e.g., to be played in association with on-demand video content), and/or other types of 2D promotional material commonly presented with web content. Because well-established commercial advertisement exchange services may have a larger selection and/or offer more convenient aggregated access to potential paid advertising than may be possible from single individual sponsors, it may be particularly advantageous for system 400 to access commercial advertisements from such services.

In certain examples, the requesting of a commercial advertisement (e.g., from either sponsor system 502 or commercial advertisement exchange service system 504) may be based on a characteristic of the user (e.g., user 202) and/or of the camera-captured real-world scenery of the immersive virtual reality world (e.g., world 208). For example, system 400 may maintain (e.g., within storage facility 410) profile data associated with user 202. For instance, system 400 may maintain demographic information for user 202 such as an age of user 202, a gender of user 202, a race of user 202, etc. Additionally or alternatively, system 400 may maintain data related to personal interests of user 202 (e.g., based on previous purchases of user 202) or other suitable data that may be used to request commercial advertisements that will be relevant, effective, and/or of interest to user 202.

Similarly, system 400 may request the commercial advertisement based on characteristics of world 208. For example, if world 208 is associated with a sporting event, system 400 may request commercial advertisements related to the sporting event (e.g., a youth football camp) or related to products that people may be likely to consume while experiencing the sporting event (e.g., soft drinks, snack foods, etc.). In other examples, system 400 may request a commercial advertisement from sponsor system 502, commercial advertisement exchange service system 504, and/or any other suitable source based on any characteristic or criterion that may serve a particular embodiment.

Billing system 506 may perform any operations related to billing sponsors that may serve a particular embodiment. For example, billing system 506 may automatically receive (e.g., from system 400) promotional effectiveness data for a particular commercial advertisement with respect to user 202 based on an extent to which user 202 has viewed and/or interacted with the commercial advertisement (e.g., based on the amount of time tracked by system 400 that the gaze of user 202 has been directed at the commercial advertisement). Examples of promotional effectiveness data that may be received will be described below. Based on the received promotional effectiveness data, billing system 506 may determine how much to bill the sponsor associated with the commercial advertisement for the placement of the commercial advertisement.

For example, if the promotional effectiveness data reveals that user 202 has not directed his or her gaze at the commercial advertisement or has done so only for a very short time, billing system 506 may determine that the sponsor should be billed a minimal amount for placement of the commercial advertisement with respect to user 202. Conversely, if the promotional effectiveness data reveals that user 202 has directed his or her gaze at the commercial advertisement for a longer period of time (e.g., perhaps long enough to trigger a supplemental action such as a video to be played back), billing system 506 may determine that the sponsor should be billed a larger amount for placement of the commercial advertisement with respect to user 202. This is because the promotional effectiveness of the commercial advertisement with respect to user 202 may be considered greater and may be more valuable to the sponsor, justifying a higher price for the placement of the commercial advertisement. Additionally, as will be described in more detail below, promotional effectiveness data of the commercial advertisement with respect to a plurality of users (e.g., including user 202) may be aggregated and billing system 506 may bill the sponsor for placement of the commercial advertisement based on the aggregated promotional effectiveness data.

Billing system 506 may communicate the determined amount of money that the sponsor owes subsequent to the presentation of the commercial advertisement to user 202 and in any way that serves a particular implementation. For example, billing system 506 may automatically send data representative of an amount owed to sponsor system 502 and/or to commercial advertisement exchange service system 504 (e.g., over network 110). In other examples, billing system 506 may facilitate billing to be performed in other suitable ways, such as by providing information for bills to be printed and sent through traditional mailing and paper document delivery services. Billing system 506 may also facilitate receiving payments from the sponsors for the commercial advertisement bills sent. For example, billing system 506 may accept electronic payments sent by sponsor system 502 and/or commercial advertisement exchange service system 504, or may automatically withdraw funds from an account associated with the sponsor according to a prearranged agreement between the operator of billing system 506 and the sponsor.

Billing system 506 may be operated by or otherwise associated with the virtual reality media content provider or with any other entity as may serve a particular implementation. In some examples, billing system 506 may be incorporated within or closely integrated with system 400, while, in other examples, billing system 506 may be operated by a third party entity and may simply receive updates from system 400 related to the promotional effectiveness data to facilitate billing system 506 in performing billing and fee collection operations.

As described above, system 400 (e.g., advertisement integration facility 404) may integrate a commercial advertisement (e.g., a commercial advertisement accessed from sponsor system 502 or from commercial advertisement exchange service system 504) into an immersive virtual reality world. In some examples, the integrating of the commercial advertisement into the immersive virtual reality world may include integrating a virtual object into the immersive virtual reality world and mapping the commercial advertisement onto an outer surface of the virtual object such that the commercial advertisement is viewable as a skin of the virtual object when the outer surface of the virtual object is located within a field of view of the immersive virtual reality world.

The virtual object may be any object that may serve a particular implementation. For example, the virtual object may be a 3D virtual object such as a context-specific virtual object that may add value to the immersive virtual reality world beyond the promotional objective of a commercial advertisement mapped onto the virtual object. For example, context-specific virtual objects may include complex objects that are similar to real objects within the immersive virtual reality world and/or are otherwise selected to fit within the context of the immersive virtual reality world. In the context of an immersive virtual reality world including a beach scene, for example, context-specific virtual objects may include virtual objects that may typically be seen in the sky (i.e., planes, parasailers, etc.), in the water (i.e., boats, animal life, etc.), or on the sand (i.e., sand castles, beach vendors, etc.) in a beach scene.

In other examples, the virtual object may be a 3D virtual object used primarily as a platform for inserting commercial advertisements into the immersive virtual reality world. For example, a virtual object with a simple shape (e.g., a rectangle) and a flat surface may be configured to stand alone in the immersive virtual reality world similar to a billboard. Alternatively, a virtual object may be configured to integrate with a real object (e.g., a camera-captured object that is part of the real-world scenery) to look as if the virtual object is wrapped around the real object (e.g., a hot air balloon). These types of virtual object may include a width dimension and/or a height dimension, but may have little or no depth dimension (i.e., appearing to be very thin or even two-dimensional). However, these virtual objects may still be considered to be 3D virtual objects when they are inserted into the immersive virtual reality world according to one or more display parameters that may be assigned to any type of virtual object and used to determine an appearance of the virtual object to user 202 as user 202 experiences the immersive virtual reality world through the field of view.

For example, the plurality of display parameters may include display parameters such as a positional parameter determinative of a location of the virtual object within the immersive virtual reality world, an orientational parameter determinative of an orientation of the virtual object within the immersive virtual reality world, and/or a scaling parameter determinative of an apparent size of the virtual object within the immersive virtual reality world. System 400 may configure at least one of the assigned plurality of display parameters to dynamically change as user 202 experiences the immersive virtual reality world such that the virtual object appears to user 202 to move within the immersive virtual reality world.

Figure 6:
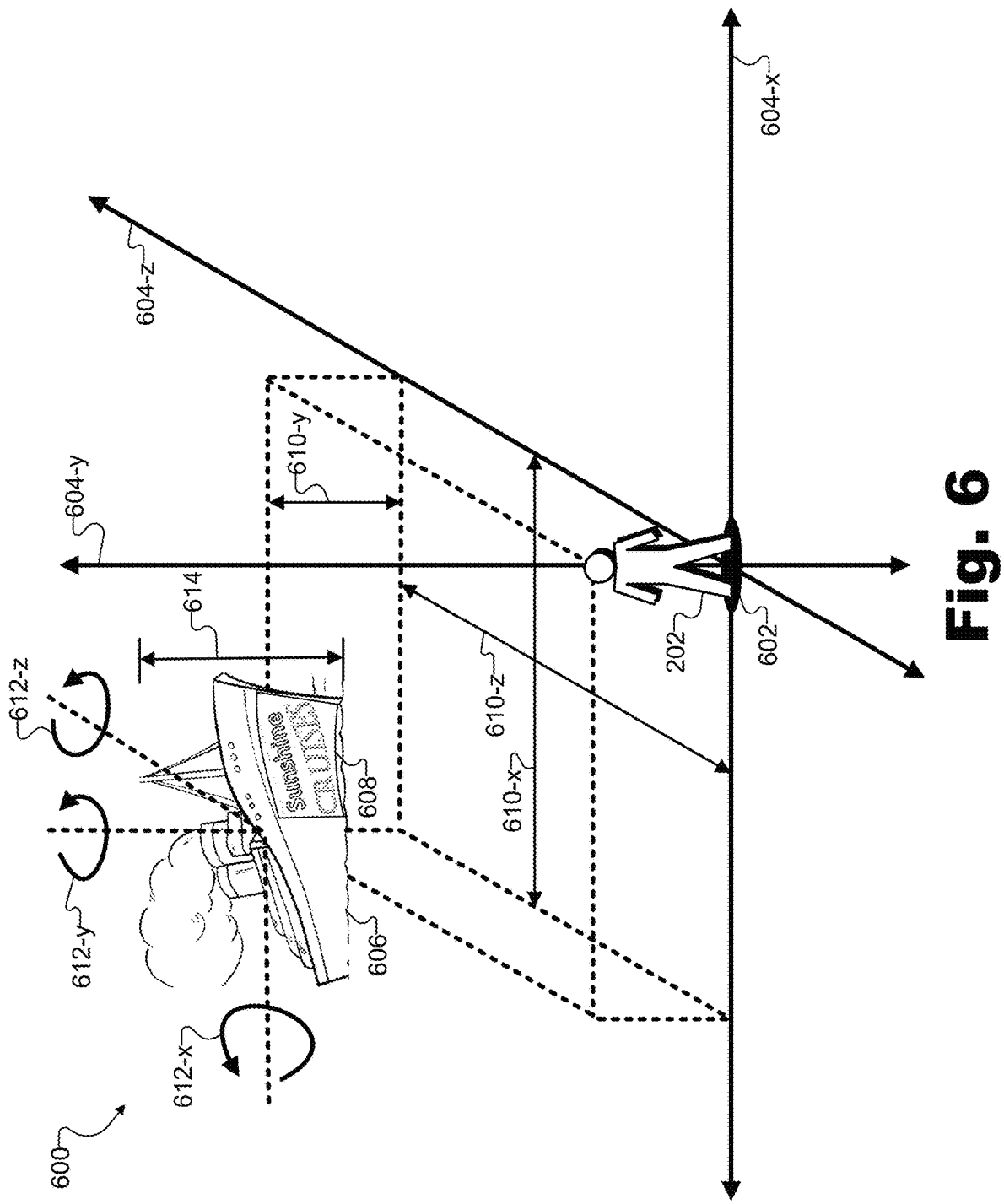
FIG. 6 illustrates exemplary display parameters assigned to an exemplary virtual object on which a commercial advertisement is presented to integrate the virtual object into an immersive virtual reality world according to principles described herein.

To illustrate, FIG. 6 shows exemplary display parameters assigned to an exemplary virtual object on which a commercial advertisement is presented to integrate the virtual object into an exemplary immersive virtual reality world. Specifically, FIG. 6 illustrates a model view 600 of an immersive virtual reality world (e.g., similar to world 208).

As shown in FIG. 6, model view 600 includes an origin 602 corresponding to a coordinate system including three axes 604 (i.e., x-axis 604-$x$, y-axis 604-$y$, and z-axis 604-$z$) that may each cross through origin 602 at orthogonal angles. Origin 602 may correspond to center point 210, described above in relation to FIG. 2, in that a renderable model of immersive virtual reality world may be maintained in relation to a center point corresponding to a camera used to capture a 360-degree image upon which the immersive virtual reality world is based (e.g., camera 102 of FIG. 1). As described above in relation to center point 210, while user 202 is shown slightly above origin 602, it will be understood that, in some implementations, origin 602 may actually be located at an eye level of user 202 rather than at the feet of user 202.

Model view 600 includes a renderable model of a virtual object 606 (i.e., a cruise ship) that includes a commercial advertisement 608 mapped onto the outer surface of the virtual object within a renderable model of the immersive virtual reality world. As used herein, a "renderable model" is a digital or mathematical representation of an object (e.g., a virtual object such as virtual object 606, an immersive virtual reality world such as world 208, etc.) that, when properly rendered for display, may be presented (or presented in part) on a display screen such as on one of the display screens of one of media player devices 300 described above in reference to FIG. 3. Thus, while a rendered view of the immersive virtual reality world may be presented to user 202 within a field of view, model view 600 illustrates how certain elements of the immersive virtual reality world such as virtual object 606 may be modeled in the data representative of the immersive virtual reality world that system 400 may provide for display on the display screen. As such, while a renderable model of virtual object 606 may persistently exist in a renderable model of the immersive virtual reality world, virtual object 606 may or may not be rendered and/or presented on the display screen of the media player device 300 used by user 202. For example, if user 202 provides user input to direct the field of view toward content of the immersive virtual reality world that does not include virtual object 606 (e.g., content behind user 202 with respect to a direction user 202 is facing), the renderable model of virtual object 606 may continue to exist in the renderable model of the immersive virtual reality world, but object 606 may not be rendered and/or presented within the field of view to be seen by user 202. Accordingly, while model view 600 of the immersive virtual reality world may be helpful for describing and illustrating the insertion of virtual objects such as virtual object 606 into the immersive virtual reality world, it will be understood that model view 600 merely represents a visual conceptualization of a particular embodiment of data representative of the immersive virtual reality world, and that model view 600 may not actually be rendered or presented to user 202 as such.

To integrate virtual object 606 into the immersive virtual reality world, system 400 may assign virtual object 606 any suitable display parameters that may be used to determine an appearance of virtual object 606 to user 202 as user 202 experiences the immersive virtual reality world through a field of view in a particular implementation. For example, as shown, virtual object 606 may be assigned one or more positional parameters 610 determinative of a location of virtual object 606 within the immersive virtual reality world (i.e., positional parameter 610-*x* determinative of the location of virtual object 606 with respect to x-axis 604-*x*, positional parameter 610-*y* determinative of the location of virtual object 606 with respect to y-axis 604-*y*, and positional parameter 610-*z* determinative of the location of virtual object 606 with respect to z-axis 604-*z*).

Virtual object 606 may further be assigned one or more orientational parameters 612 determinative of a rotational orientation of virtual object 606 within the immersive virtual reality world (i.e., orientational parameter 612-*x* determinative of the orientation of virtual object 606 with respect to x-axis 604-*x*, orientational parameter 612-*y* determinative of the orientation of virtual object 606 with respect to y-axis 604-*y*, and orientational parameter 612-*z* determinative of the orientation of virtual object 606 with respect to z-axis 604-*z*).

Virtual object 706 may also be assigned one or more scaling parameters determinative of an apparent size of virtual object 606 within the immersive virtual reality world, as illustrated by scaling parameter 614. In the implementation of FIG. 6, a single scaling parameter 614 is illustrated to show that virtual object 606 may be configured to scale proportionally along each orthogonal dimension such that virtual object 606 maintains a constant form rather than allowing one dimension of virtual object 606 to scale disproportionately from another dimension. However, it is noted that a plurality of scaling parameters 614 (e.g., separate scaling parameters to scale virtual object 606 independently with respect to each of axes 604) may be used in certain implementations.

Additionally, virtual object 606 may be assigned a time parameter determinative of a time period during which virtual object 606 is viewable within the immersive virtual reality world. While a time parameter is not explicitly illustrated in FIG. 6, it will be understood that the immersive virtual reality world may change dynamically as time passes such that certain virtual objects that are presented at one time may not necessarily be presented at a later time. For example, if the immersive virtual reality world is associated with a virtual reality media content program (e.g., a virtual reality movie or a virtual reality television show), a scene represented within the immersive virtual reality world during a first time period of the virtual reality media content program may include virtual object 606, while a scene represented during a second time period later in the virtual reality media content program may no longer include virtual object 606.

In some examples, at least one of the display parameters assigned to virtual object 606 (e.g., positional parameters 610, orientational parameters 612, and/or scale parameter 614) may dynamically change as time in the immersive virtual reality world passes and user 202 experiences the immersive virtual reality world. As such, virtual object 606 may appear to user 202 to move or change within the immersive virtual reality world. For example, if one or more positional parameters 610 assigned to virtual object 606 dynamically change as user 202 experiences the immersive virtual reality world, the location of virtual object 606 within the immersive virtual reality world (e.g., in relation to other content of the immersive virtual reality world) may appear to change over time. Specifically, virtual object 606 may appear to approach user 202, recede from user 202, move across the immersive virtual reality world, or otherwise change locations within the immersive virtual reality world.

Similarly, if one or more orientational parameters 612 assigned to virtual object 606 dynamically change as user 202 experiences the immersive virtual reality world, the rotational orientation of virtual object 606 within the immersive virtual reality world (e.g., in relation to other content of the immersive virtual reality world) may appear to change over time. For example, virtual object 606 may appear to gradually rotate such that virtual object 606 may be viewed from multiple perspectives, virtual object 606 may appear to spin or otherwise rotate in response to user input or events occurring in the immersive virtual reality world (e.g., the cruise ship of virtual object 606 may appear to turn and change direction as the cruise ship approaches a dock or a shoreline within the immersive virtual reality world).

Additionally, if scale parameter 614 assigned to virtual object 606 dynamically changes as user 202 experiences the immersive virtual reality world, the apparent size of virtual object 606 within the immersive virtual reality world (e.g., in relation to other content of the immersive virtual reality world) may appear to change over time. For example, virtual object 606 may appear to grow or shrink based on user input and/or events occurring within the immersive virtual reality world.

Regardless of the display parameters that are assigned to virtual object 606 and how virtual object 606 is displayed within the immersive virtual reality world, commercial advertisement 608 may be mapped onto an outer surface of virtual object 606 (e.g., on the hull of the cruise ship) such that commercial advertisement 608 is viewable as a skin (e.g., a texture) of virtual object 606 when the outer surface of virtual object 606 is located within the field of view of the immersive virtual reality world. For example, commercial advertisement 608 may be viewable by user 202 as a skin of virtual object 606 when user 202 directs the field of view in the general direction of virtual object 606 within the immersive virtual reality world and when virtual object 606 is positioned (i.e., according to positional parameters 610), oriented (i.e., according to orientational parameters 612), and scaled (i.e., according to scaling parameters 614) such that the outer surface of virtual object 606 that includes commercial advertisement 608 (i.e., the forward hull of the ship) is visible to user 202 within the field of view. Advantageously, commercial advertisement 608 may be changed, updated, streamed, and/or otherwise presented as a skin or texture of virtual object 606 whether commercial advertisement 608 includes a still image, a video image, or any another suitable advertising content.

Commercial advertisement 608 may be representative of any type of commercial advertisement including any still image, animated image, or video content associated with promotional efforts of a sponsor. For example, commercial advertisement 608 may be requested and/or accessed from a commercial advertisement exchange service (e.g., by way of commercial advertisement exchange service system 504) based on one or more characteristics of user 202 and/or the immersive virtual reality world, as described above. In some examples, commercial advertisement 608 may be a banner advertisement (e.g., a still image or animated image that includes purely visual content). In other examples, commercial advertisement 608 may include a video presentation (e.g., a video such as a television-style commercial spot) that includes audio and visual content.

Commercial advertisement 608 may be interactive such that commercial advertisement 608 may present a banner advertisement under normal circumstances but may begin a supplemental action such as a video presentation under special circumstances such as when system 400 detects that a gaze of user 202 is directed at commercial advertisement 608 for a predetermined length of time. Similarly, commercial advertisement 608 may be interactive such that user 202 may interact with commercial advertisement 608 to get more information about a product, service, or other promotional objective associated with commercial advertisement 608. For example, system 400 may present additional information associated with the promotional objective of commercial advertisement 608 such as a location where a product associated with commercial advertisement 608 can be purchased, a phone number whereby a service associated with commercial advertisement 608 may be obtained, or a website whereby any promotional objective associated with commercial advertisement 608 can be researched or accessed. In certain examples, system 400 may present (e.g., within a full screen view or on the outer surface of object 606 where commercial advertisement 608 is displayed) a simplified or full web browser by which a user 202 may actively research and/or purchase items or services associated with the promotional objective of commercial advertisement 608.

More particularly, as shown in FIG. 6, commercial advertisement 608 may include a commercial advertisement for a commercial cruise line called "Sunshine Cruises." As such, commercial advertisement 608 may include a logo identifying the cruise line and any pictorial or animated graphics that may serve a particular implementation to further facilitate promotion of the cruise line. An embedded video presentation or link to a website for Sunshine Cruises may additionally be embedded within data representative of commercial advertisement 608 to be activated by system 400 when particular circumstances arise (e.g., user 202 selects commercial advertisement 608 or is detected to have directed his or her gaze to commercial advertisement 608 as will be described below). As described above in relation to FIG. 5, system 400 may access commercial advertisement 608 for Sunshine Cruises by directly receiving data representative of commercial advertisement 608 from sponsor system 502, which may be, in this example, a server system associated with the Sunshine Cruises cruise line company. Additionally or alternatively, system 400 may request, from third-party commercial advertisement exchange service system 504, a commercial advertisement associated with cruises or vacations or the like based on maintained profile data indicating that user 202 has purchased cruises in the past, a detection that the immersive virtual reality world is a tropical world similar to destinations to which Sunshine Cruises sails, etc. In response, commercial advertisement exchange service system 504 may provide commercial advertisement 608, which the Sunshine Cruises cruise line agrees to pay to promote within world 208.

Based on renderable models of the immersive virtual reality world and one or more virtual objects included within the immersive virtual reality world, system 400 may provide a field of view of the immersive virtual reality world for display on a media player device such as the devices described above in relation to FIG. 3. The user may experience the immersive virtual reality world through the field of view and, while experiencing the immersive virtual reality world, may choose to direct the field of view and his or her gaze at a virtual object such as virtual object 606 and/or a commercial advertisement such as commercial advertisement 608.

Figure 7:
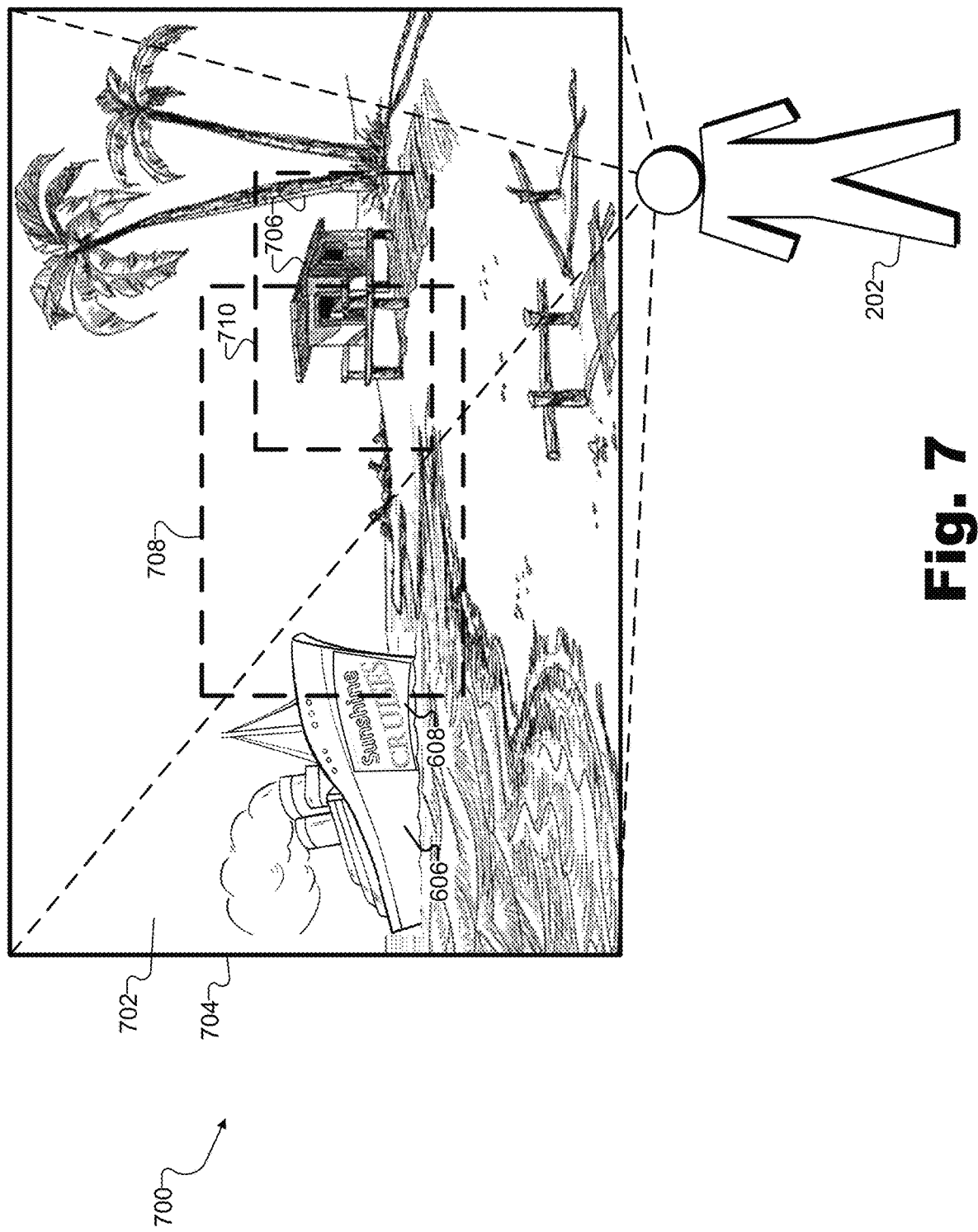
FIGS. 7 and 8 illustrates an exemplary field of view of an immersive virtual reality world into which the virtual object of FIG. 6 is integrated according to principles described herein.
Figure 8:
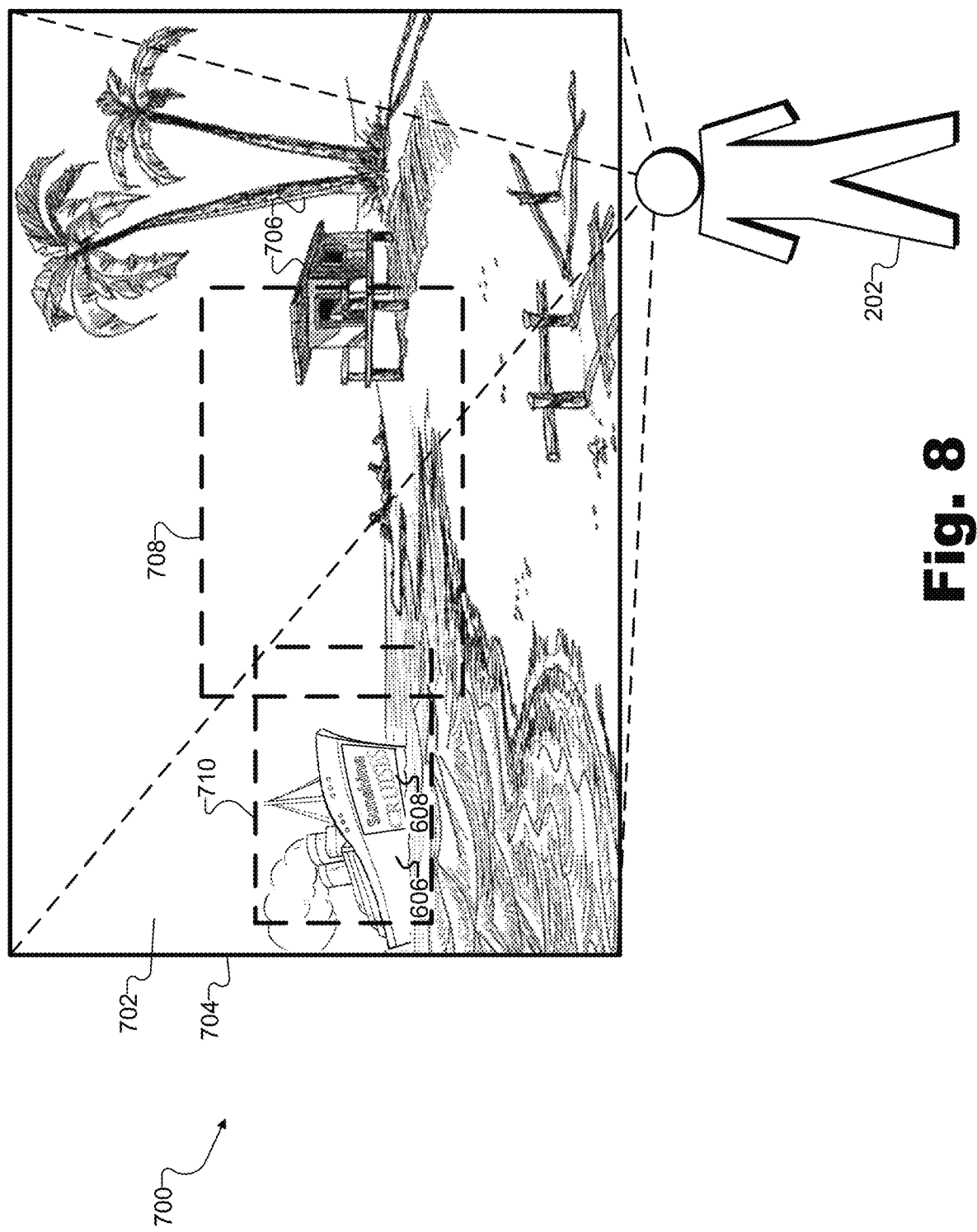

To illustrate, FIGS. 7-8 show an exemplary field of view of an immersive virtual reality world 700 ("world 700") into which virtual object 606 may be integrated. For example, world 700 may be the immersive virtual reality world of model view 600 (i.e., the immersive virtual reality world into which the renderable models included within model view 600 are integrated). As shown, user 202 may experience world 700 by viewing content 702 of world 700 through a field of view 704. Within field of view 704, content 702 may include camera-captured real-world scenery depicting a tropical beach scene. User 202 may have entered user input to dynamically direct field of view 704 to include content showing a perspective looking down the beach that includes one or more real objects 706 (i.e., camera-captured objects such as a beach shack and palm trees that were present in the real-world scenery rather than integrated into world 700 later) as well as one or more virtual objects such as virtual object 606 (i.e., the cruise ship in the water). As shown within field of view 704, virtual object 606 is displayed within world 700 according to display parameters such as positional parameters 610, orientational parameters 612, and scaling parameters 614, as described above in relation to FIG. 6. Additionally, as described above, commercial advertisement 608 is mapped onto the outer surface of virtual object 606 to be viewed by user 202 as user 202 experiences world 700.

As explained above, system 400 (e.g., tracking facility 406) may detect that a gaze of user 202 is directed at commercial advertisement 608 while commercial advertisement 608 is included within field of view 704. System 400 may perform this detection in any way that serves a particular implementation. For example, system 400 may detect that the gaze of the user is directed at commercial advertisement 608 by tracking a gaze reticle persistently centered within field of view 704 with respect to at least one of a vertical dimension of field of view 704 and a horizontal dimension of field of view 704 and then determining, based on the tracking of the gaze reticle, that the gaze reticle is directed at commercial advertisement 608. As used herein, a gaze reticle may be a particular area of field of view 704 (e.g., a small area in the horizontal and/or vertical center of field of view 704) where the gaze of user 202 may often reside. For example, while a user may view a larger portion of field of view 704 than just the gaze reticle in the center and/or may look at other portions of field of view 704 other than the gaze reticle by turning his or her eyes without moving field of view 704 (e.g., without turning his or her head), system 400 may be configured to assume that the user's gaze is generally focused at the gaze reticle in the center of field of view 704.

Based on the tracking of the gaze reticle, system 400 may detect that the gaze reticle is directed at commercial advertisement 608 and may further track an amount of time that the gaze reticle is directed at commercial advertisement 608. Accordingly, based on the detection that the gaze reticle remains persistently directed at commercial advertisement 608 for the tracked amount of time, system 400 may assume that the actual gaze of user 202 has been similarly directed at commercial advertisement 608 for the tracked amount of time. As a result, system 400 may generate promotional effectiveness data for the commercial advertisement with respect to user 202 based on the tracked amount of time, trigger a supplemental action, or perform another suitable operation.

To illustrate, FIG. 7 shows a gaze reticle 708 within field of view 704 of world 700. As shown, gaze reticle 708 is an area of field of view 704 that is approximately centered both horizontally and vertically within field of view 704. In certain examples, gaze reticle 708 may be centered either horizontally or vertically within field of view 704 but not both, or may be offset from the center of field of view 704 with respect to both the horizontal and the vertical dimension of field of view 704 as may serve a particular embodiment.

Gaze reticle 708 may be any size that may serve a particular implementation. For example, gaze reticle 708 may be very small, requiring user 202 to direct field of view 704 very squarely at commercial advertisement 608 before system 400 will detect that the gaze of user 202 is directed at commercial advertisement 608 and begin tracking the amount of time that the gaze of user 202 is directed at commercial advertisement 608. As such, any promotional effectiveness data generated for commercial advertisement 608 may reflect a relatively conservative assessment of how long user 202 spent looking at commercial advertisement 608, and any supplemental action of commercial advertisement 608 triggered by the gaze of user 202 may be relatively unlikely to be triggered inadvertently. Conversely, in other examples, gaze reticle 708 may be relatively large (e.g., up to the size of the entire field of view 704), resulting in promotional effectiveness data that reflects a more generous assessment of the amount of time the gaze of user 202 was directed at commercial advertisement 608 and/or resulting in a supplemental action from commercial advertisement 608 that is much easier for user 202 to trigger. In some embodiments the size of gaze reticle 708 may change based on what content is included within field of view 704 or based on different agreements with different sponsors as different commercial advertisements are included within field of view 704. Gaze reticle 708 may be visible or invisible to user 202 as user 202 experiences world 700.

As another example of detecting that the gaze of user 202 is directed at commercial advertisement 608 while commercial advertisement 608 is included within field of view 704, system 400 may track eye movements of user 202 as user 202 experiences world 700 and may determine, based on the tracking of the eye movements, that user 202 is looking at commercial advertisement 608. For example, system 400 may detect and track an angle at which the retinas of user 202 are directed at various points in time to precisely determine which area of field of view 704 user 202 is viewing at the various points in time.

To illustrate, an eye-tracking area 710 is shown in FIG. 7 to represent an area of field of view 704 in which user 202 is actually detected to be looking based on the eye tracking. Unlike gaze reticle 708, eye-tracking area 710 may dynamically change based on eye movements of user 202 (e.g., the angle at which the retinas of user 202 are directed) even when field of view 704 remains stationary. While in many examples eye-tracking area 710 may tend to be close to gaze reticle 708 in the center of field of view 704, eye-tracking area 710 may be located within any part of field of view 704 that user 202 may see. As with gaze reticle 708, an indicator associated with eye-tracking area 710 may be displayed visibly within field of view 704 or eye-tracking area 710 may be invisible as may serve a particular implementation.

To illustrate how gaze reticle 708 and eye-tracking area may be used by system 400 to detect that the gaze of user 202 is directed at commercial advertisement 608, FIG. 7 shows that gaze reticle 708 is relatively large and is at least partially overlapping with commercial advertisement 608. As such, in some embodiments, system 400 may detect, based on the relative positioning of gaze reticle 708 and commercial advertisement 608, that the gaze of user 202 is directed at commercial advertisement 608. As a result of the detecting, system 400 may begin tracking the amount of time that the gaze of the user is directed at commercial advertisement 608 by tracking the amount of time that gaze reticle remains at least partially overlapping with commercial advertisement 608. In other embodiments, system 400 may only detect that the gaze of user 202 is directed at commercial advertisement 608 when commercial advertisement 608 is completely or mostly overlapping with gaze reticle 708 (as opposed to just partially overlapping as depicted in FIG. 7).

FIG. 7 shows that eye-tracking area 710 is relatively small (i.e., smaller than gaze reticle 708) and is not directed at commercial advertisement 608, but, rather, is directed at a real object 706 (i.e., the beach shack). As such, an implementation employing eye-tracking area 710 in addition to or as an alternative to gaze reticle 708 may detect that the gaze of user 202 is not currently directed at commercial advertisement 608, despite the relatively close proximity of commercial advertisement 608 to the center of field of view 704.

In contrast, FIG. 8 shows an example where virtual object 606 is slightly further away and/or less proximate to the center of field of view 704. In this example, an implementation relying on gaze reticle 708 may detect that the gaze of user 202 is not currently directed at commercial advertisement 608 because commercial advertisement 608 is not overlapping with gaze reticle 708 at all. However, an implementation that employs eye-tracking may detect that the gaze of user 202 is currently directed at commercial advertisement 608 based on eye-tracking area 710, which is shown to be directly aligned with commercial advertisement 608.

Regardless of how the gaze of user 202 is tracked (e.g., by gaze reticle 708, by eye-tracking area 710, or by a combination of both or another suitable method), once system 400 determines that the gaze of user 202 is directed at commercial advertisement 608, system 400 may track an amount of time that the gaze of user 202 is directed at commercial advertisement 608 (e.g., before the gaze of user 202 moves, before commercial advertisement 608 moves, etc.).

Based on the tracked amount of time, system 400 may perform a supplemental action associated with commercial advertisement 608. For example, commercial advertisement 608 may appear to be a still image (e.g., the "Sunshine Cruises" logo shown in FIG. 8) until user 202 directs his or her gaze to the logo for a predetermined amount of time (e.g., 2-3 seconds). At this point, system 400 may perform a supplemental action such as playing back a video (i.e., including audiovisual content) associated with commercial advertisement 608 on object 606 where the logo of commercial advertisement 608 appeared before. In other examples, the supplemental action may include darkening out a portion of world 700 or temporarily magnifying commercial advertisement 608 to make commercial advertisement 608 easier for user 202 to see. The supplemental action may also include presenting an audio clip or an animation (e.g., a video without accompanying audio). Virtual object 606 may also be involved with the supplemental action, rather than commercial advertisement 608 alone. For example, the cruise ship may sail more closely to user 202 or may sound its foghorn. Additionally, other suitable supplemental actions (e.g., other supplemental action disclosed herein) may be performed or any combination of supplemental actions may be performed as may serve a particular embodiment.

In addition or as an alternative to determining that supplemental actions are triggered, system 400 may use the tracked amount of time that user 202 has been detected to direct his or her gaze at commercial advertisement 608 to generate and/or report (e.g., to billing system 506 described above in relation to FIG. 5) content effectiveness analytics such as promotional effectiveness data. System 400 may generate and/or report promotional effectiveness data in any way and/or at any time that may serve a particular embodiment.

For example, system 400 may generate promotional effectiveness data for commercial advertisement 608 that includes data indicative of a number of separate instances that the gaze of user 202 has been directed at commercial advertisement 608. System 400 may also generate promotional effectiveness data for commercial advertisement 608 that includes data indicative of a total amount of time (e.g., measured in milliseconds, seconds, or another suitable unit of time) that the gaze of user 202 has been directed at the commercial advertisement in one instance or as an aggregation of the separate instances that the gaze of user 202 has been directed at commercial advertisement 608. Moreover, system 400 may generate promotional effectiveness data for commercial advertisement 608 that includes data indicative of whether a supplemental action associated with commercial advertisement 608 has been triggered based on the amount of time that the gaze of user 202 is directed at commercial advertisement 608 and/or that indicates which supplemental action (or actions) has (or have) been triggered.

Once the promotional effectiveness data has been generated, system 400 may report the promotional effectiveness data at any time and/or in any way that may suit a particular implementation. For example, in certain implementations, promotional effectiveness data may be reported immediately when there is new data to report. Specifically, each time a user's gaze is directed at a commercial advertisement, the time that the user directs his or her gaze at the commercial advertisement may be determined (e.g., in milliseconds, seconds, etc.) and immediately reported (e.g., once the gaze of the user leaves the commercial advertisement). Alternatively, in other implementations, promotional effectiveness data may be accumulated (e.g., stored within storage facility 410) within system 400 and reported (e.g., in an aggregated batch of promotional effectiveness data) at a later time. For example, promotional effectiveness data may be reported regularly on a particular time schedule (e.g., once a minute) or may be reported after a virtual reality media content program has terminated. In examples where battery life of a media player device is of particular concern, it may be especially advantageous to accumulate and send aggregated batches of promotional effectiveness data.

Figure 9:
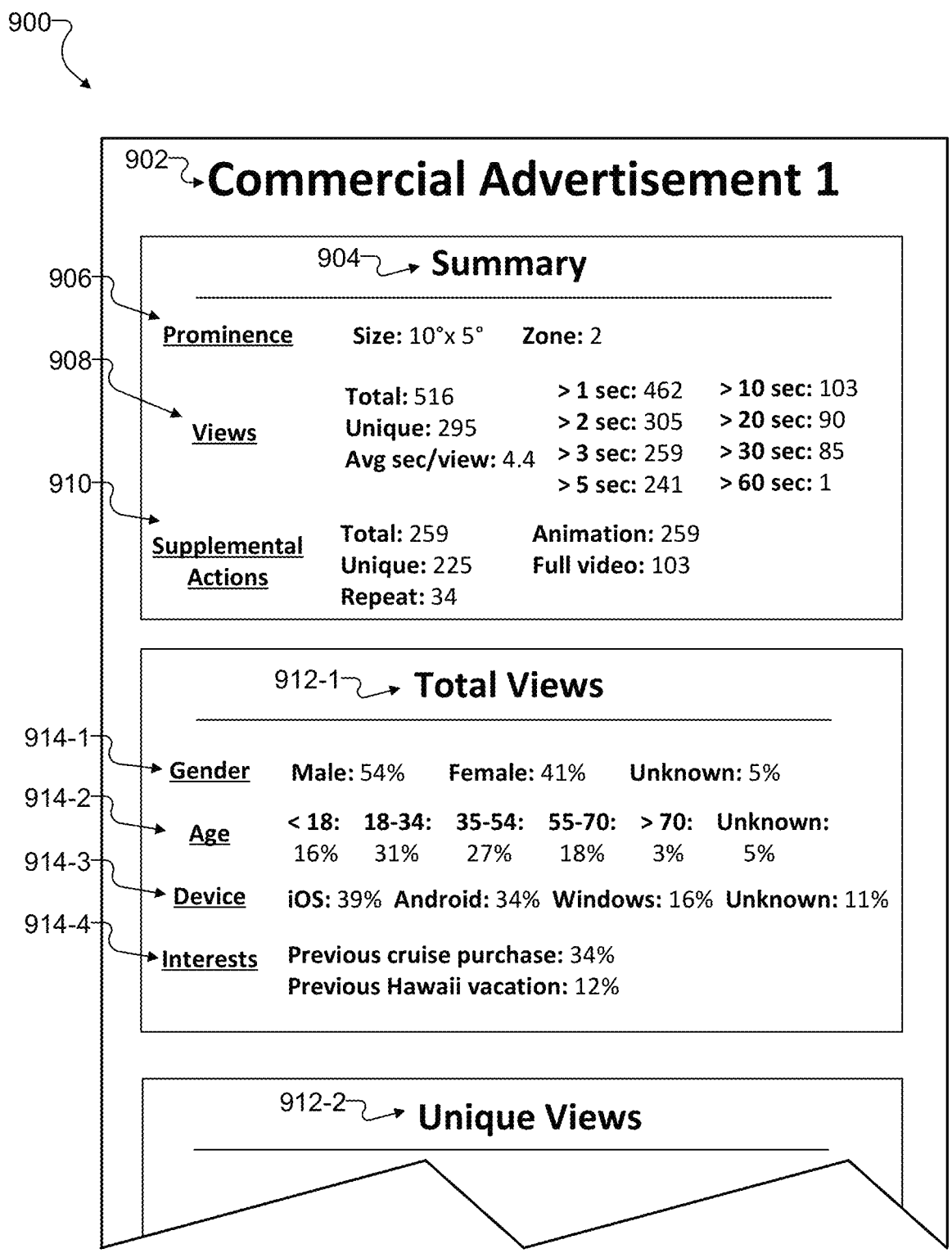
FIG. 9 illustrates exemplary aggregated promotional effectiveness data for an exemplary commercial advertisement with respect to an exemplary plurality of users according to principles described herein.

To illustrate promotional effectiveness data that may be generated and/or reported, FIG. 9 shows exemplary aggregated promotional effectiveness data 900 ("data 900") for an exemplary commercial advertisement 902 (i.e. "Commercial Advertisement 1") with respect to an exemplary plurality of users. While system 400 is described below as generating, aggregating, and reporting data 900 for the plurality of users with respect to commercial advertisement 902, it will be understood that one or more other systems may generate, aggregate, and/or report data 900 as may serve a particular embodiment. For example, system 400 may simply generate and report promotional effectiveness data with respect to individual users (e.g., as the individual users experience the immersive virtual reality world), and a different system or device (e.g., billing system 506) may aggregate and/or present data 900.

In certain examples, data 900 may be presented to an operator of system 400 or billing system 506, or to a sponsor associated with sponsor system 502. For example, system 400, billing system 506, and/or sponsor system 502 may present a user interface (e.g., a graphical user interface) in which data 900 may be presented to a user of the respective system. Moreover, data 900 may be presented in a user-friendly way that allows data 900 to conveniently be explored, analyzed, and/or manipulated. For example, the user interface may display visual indications of data 900 (e.g., bar graphs, etc.) and may allow a user to sort, filter, organize, hide, expand, and/or otherwise manipulate data 900 in any way that may serve to facilitate the user in gathering, using, and/or understanding the promotional effectiveness data in a particular implementation.

Aggregated promotional effectiveness data such as data 900 may provide insight and/or otherwise facilitate the billing system in determining a proper amount to charge a sponsor for placement of one or more commercial advertisements more effectively than non-aggregated promotional effectiveness data (e.g., data associated with only one user). For example, aggregated promotional effectiveness data may be more useful in revealing how effective a particular commercial advertisement is to a particular target demographic group.

As shown in FIG. 9, data 900 may include summary data 904, which may include data related to the general promotional effectiveness of commercial advertisement 902 for all of the users within the plurality of users whose promotional effectiveness data is aggregated into data 900. For example, summary data 904 may include prominence data 906 for commercial advertisement 902, view data 908 for commercial advertisement 902, supplemental action data 910 for commercial advertisement 902, and/or any other data that may help summarize the promotional effectiveness of commercial advertisement 902 for the plurality of users in a particular implementation.

Prominence data 906 may include data representative of a display size of commercial advertisement 902 (e.g., expressed in apparent size in the immersive virtual reality world, in degrees of the immersive virtual reality world covered by commercial advertisement 902, etc.). For example, a commercial advertisement with a larger display size may be considered more prominent (i.e., more visible to users and thus more valuable to sponsors) than a commercial advertisement with a smaller display size. Similarly, prominence data 906 may include data representative of a prominence zone of the immersive virtual reality world in which the commercial advertisement may be located. For example, as shown, data 900 may indicate that commercial advertisement 902 is located in a prominence zone 2. As such, commercial advertisement 902 may be considered less prominent (i.e., less likely to be viewed) than a commercial advertisement in a prominence zone 1 (e.g., a zone where users may tend to look very often) but more prominent than a commercial advertisement in a prominence zone 3 (e.g., a zone where users may tend to look very rarely). Prominence zones will be described in more detail below.

View data 908 may include data representative of total views (e.g., all of the instances where any of the plurality of users has viewed commercial advertisement 902), unique views (e.g., the number of users in the plurality of users that have viewed commercial advertisement 902 at least once), average time per view (e.g., the average number of seconds or milliseconds that each of the total views lasted), and/or any other data related to the users' viewing of commercial advertisement 902 that may serve a particular implementation. Because each separate instance of a view of commercial advertisement 902 may be determined (e.g., down to a precise number of milliseconds) and recorded, view data 908 may also indicate how many views of the total views fall within one or more time duration categories. For example, as shown, the number of views lasting at least 1 second, at least 2 seconds, at least 3 seconds, at least 5 seconds, at least 10 seconds, at least 20 seconds, at least 30 seconds, and at least 60 seconds may be included within view data 908.

Supplemental action data 910 may include data representative of total supplemental actions (e.g., all the supplemental actions of any type that were triggered by the plurality of users), unique supplemental actions (e.g., the number of users in the plurality of users that viewed at least one supplemental action of any type), repeat supplemental actions (e.g., the number of users in the plurality of users that viewed at least one supplemental action repeatedly), and/or any other data related to the users' triggering of supplemental actions for commercial advertisement 902 that may serve a particular implementation. Because there may be different types of supplemental actions associated with a single commercial advertisement, supplemental action data 910 may further include data representative of which supplemental actions has been triggered and/or how many times each supplemental action has been triggered. For example, commercial advertisement 902 may appear to come to life (i.e., display a short animation) if a user's gaze is directed at commercial advertisement 902 for at least 3 seconds, and may present a full video if the user's gaze continues to be directed at commercial advertisement 902 for a full 10 seconds.

As illustrated by data 900, system 400 may aggregate generated promotional effectiveness data for a commercial advertisement with respect to one user with generated promotional effectiveness data for the commercial advertisement with respect to a plurality of other users to generate aggregated promotional effectiveness data for the commercial advertisement with respect to a plurality of users experiencing a particular immersive virtual reality world. Additionally, as described above, system 400 may determine, access, or manage profile data related to one or more of the plurality of users that may experience the immersive virtual reality world. As such, system 400 may incorporate into aggregated promotional effectiveness data (i.e., data 900) profile data related to the plurality of users experiencing the immersive virtual reality world.

For example, as shown in FIG. 9, data 900 may include specific profile data related one or more promotional effectiveness data categories 912 (e.g., categories 912-1, 912-2, etc.) such as promotional effectiveness data categories summarized in summary data 904 (e.g., "Total Views," "Unique Views," etc.) and/or other promotional effectiveness data categories that may serve a particular implementation. In some examples, profile data 914 (e.g., gender data 914-1, age profile data 914-2, device profile data 914-3, personal interest profile data 914-4, etc.) included within one of categories 912 may be presented within a graphical user interface as described above by hiding some of the profile data 914 by default and allowing an operator using the graphical user interface to expand various categories 912 and/or profile data 914 to explore and analyze the data in any way the operator chooses. Each category 912 may include any profile data that may serve to reveal how promotionally effective commercial advertisement 902 may be with either a broad demographic group (e.g., males, etc.), or a more specific demographic group (e.g., females ages 18-54 using iOS or Android devices who have previously purchased a cruise vacation, etc.).

Figure 10:
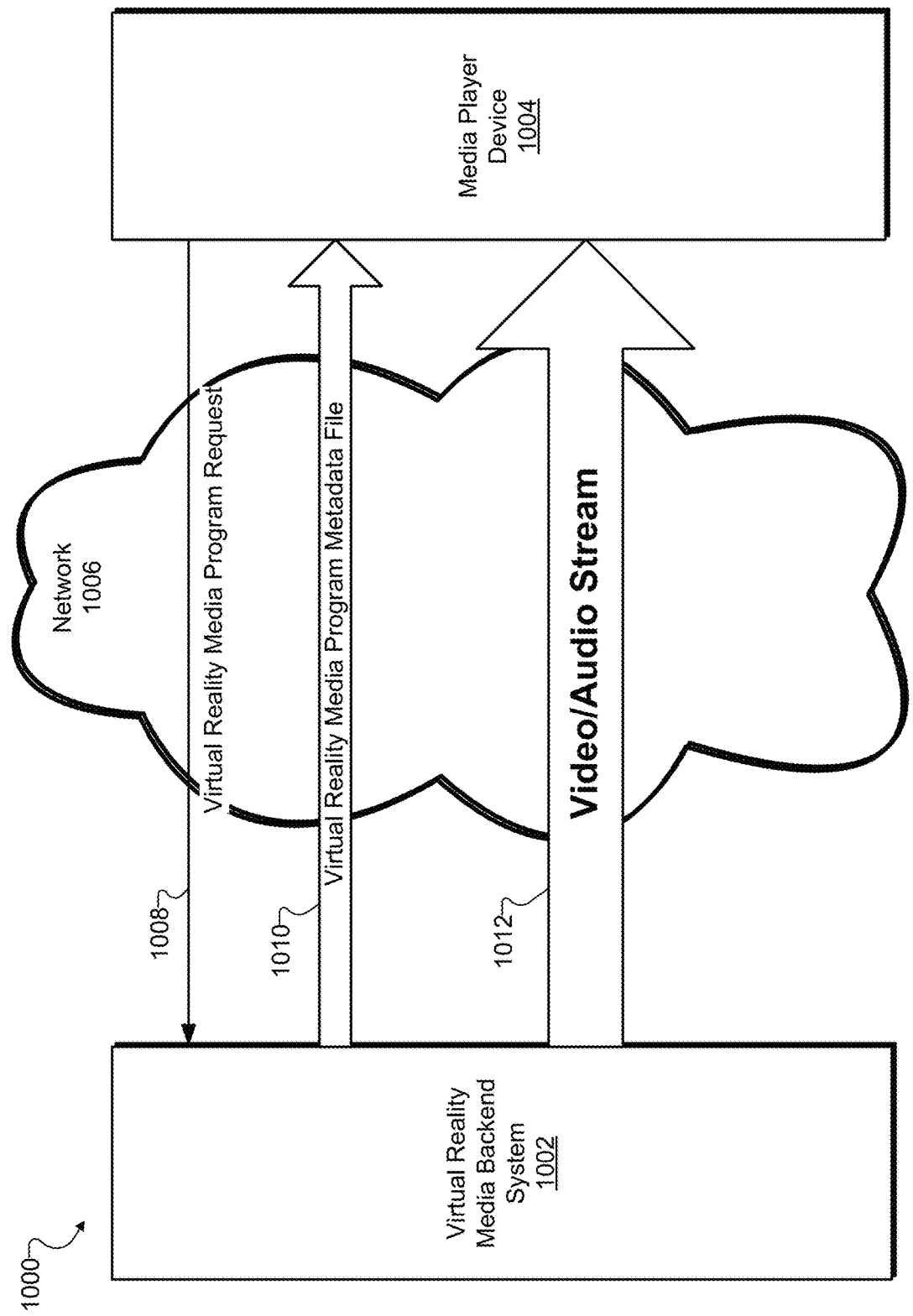
FIG. 10 illustrates an exemplary configuration in which an exemplary virtual reality media backend system and an exemplary media player device operate to insert additional content into an immersive virtual reality world according to principles described herein.

FIG. 10 illustrates an exemplary configuration 1000 in which an exemplary virtual reality media backend system 1002 ("backend system 1002") and an exemplary media player device 1004 operate to insert additional content (e.g., a virtual object, a commercial advertisement, etc.) into an immersive virtual reality world. Backend system 1002 and media player device 1004 may be the same or similar to other systems and/or devices described herein, and, as such, may each be implemented by an end-user device, by a server device that streams media content to an end-user device, or distributed across an end-user device and a server device. For example, backend system 1002 may be the same or similar to backend system 108, and media player device 1004 may be the same or similar to any of media player devices 112 or 300. Additionally, backend system 1002 and/or media player device 1004 may implement, individually or together in combination, some or all of the functionality of system 400 described above.

As shown, backend system 1002 and media player device 1004 may be communicatively coupled via a network 1006, which may use various network components and protocols to facilitate communication between backend system 1002 and media player device 1004 in the same or a similar fashion as described above in relation to network 110. In particular, as will be described below, network 1006 may carry data representative of a virtual reality media program request 1008 ("request 1008"), a virtual reality media program metadata file 1010 ("metadata file 1010"), a video/ audio stream 1012, and any other data that may be transferred between backend system 1002 and media player device 1004.

As illustrated by configuration 1000, in operation, media player device 1004 may transmit request 1008 to backend system 1002 over network 1006. For example, media player device 1004 may transmit request 1008 (e.g., a Hypertext Transfer Protocol ("HTTP") call) based on user input from a user of media player device 1004. Specifically, media player device 1004 may provide the user one or more options to request access to virtual reality media content such as by providing a selection of links (e.g., HTTP links) to a variety of virtual reality media content (e.g., different immersive virtual reality worlds). In response to user input to access the virtual reality media content of a particular immersive virtual reality world (e.g., a user selection of a particular link from the selection of links), media player device 1004 may transmit request 1008 to backend system 1002. Request 1008 may include a command (e.g., associated with an HTTP call) that causes backend system 1002 to transmit data representative of metadata file 1010 and/or video/audio stream 1012 to media player device 1004 by way of network 1006.

As one example, request 1008 may include a command that causes backend system 1002 to transmit data representative of metadata file 1010 to media player device 1004, and metadata file 1010 may include data representative of one or more additional commands that cause media player device 1004 to perform other operations including requesting, receiving, and/or presenting video/audio stream 1012. For instance, prior to presenting the immersive virtual reality world for the user to experience, additional commands in metadata file 1010 may cause media player device 1004 to request (e.g., from sponsor system 502 or commercial advertisement exchange service system 504 of FIG. 5), receive, and/or present a pre-roll commercial advertisement video to the user based upon keywords and/or tags included in metadata file 1010. After the commercial advertisement video has been presented, metadata file 1010 may include additional commands to cause media player device 1004 to request, receive, and/or present a virtual reality media program based on video/audio stream 1012 and other data within metadata file 1010, as described below. Additionally or alternatively, metadata file 1010 may include additional commands to cause media player device 1004 to request, receive, and/or present one or more mid-roll commercial advertisement videos during the presentation of the virtual reality media program (e.g., during a commercial break), or one or more post-roll commercial advertisement videos after the presentation of the virtual reality media program.

As another example, metadata file 1010 may include metadata related to one or more virtual objects (e.g., display parameters for the virtual objects, keywords or tags for commercial advertisements that may be associated with the virtual objects, etc.) that may be located within the immersive virtual reality world selected by the user. Video/audio stream 1012 may include data representative of content of the immersive virtual reality world other than virtual objects inserted into the world based on, for example, data included within metadata file 1010. For example, video/audio stream 1012 may include video and/or audio data related to real-world scenery content (e.g., a 360-degree image captured by a camera such as camera 102) of the immersive virtual reality world.

Media player device 1004 may receive, analyze, and/or otherwise use video/audio stream 1012 to present the immersive virtual reality world within a field of view for the user. In certain examples, virtual objects, commercial advertisements, and/or other additional content may be inserted into the immersive virtual reality world at static locations at which users will likely see the virtual objects and/or commercial advertisements, but where the virtual objects and/or commercial advertisements may not be overly intrusive or distracting to the overall virtual reality experience of the user. For example, a virtual reality media content provider may track where various users experiencing an immersive virtual reality world tend to look and create a focus map (e.g., which may appear similar to a heat map) of the immersive virtual reality world representative of where user focus tends to be directed. Focus maps may also facilitate dividing the immersive virtual reality world into a plurality of prominence zones within which virtual objects and/or commercial advertisements may be located. For example, as mentioned above, one prominence zone may be in an area of the immersive virtual reality world that tends to be viewed by users often and/or for long periods of time, and may thus be a more prominent (e.g., and therefore valuable) location for a commercial advertisement to be displayed. In contrast, other prominence zones may include areas of the immersive virtual reality world that tend to be viewed by users less often and/or for shorter periods of time, and may thus be considered less prominent (e.g., and therefore less valuable) locations for commercial advertisements to be displayed.

For example, based on the focus map, the virtual reality media content provider may determine that placing a virtual object at a particular location and/or within a particular prominence zone (e.g., a location or prominence zone slightly below the user's line of sight if the user is looking straight ahead) will likely result in users seeing the virtual object and/or the commercial advertisement while not being overly distracted by the virtual object and/or the commercial advertisement. In these examples, data related to the virtual objects and/or commercial advertisements may be static (e.g., programmed into software on media player device 1004, etc.) and may not utilize specific metadata such as may be included within metadata file 1010.

Figure 11:
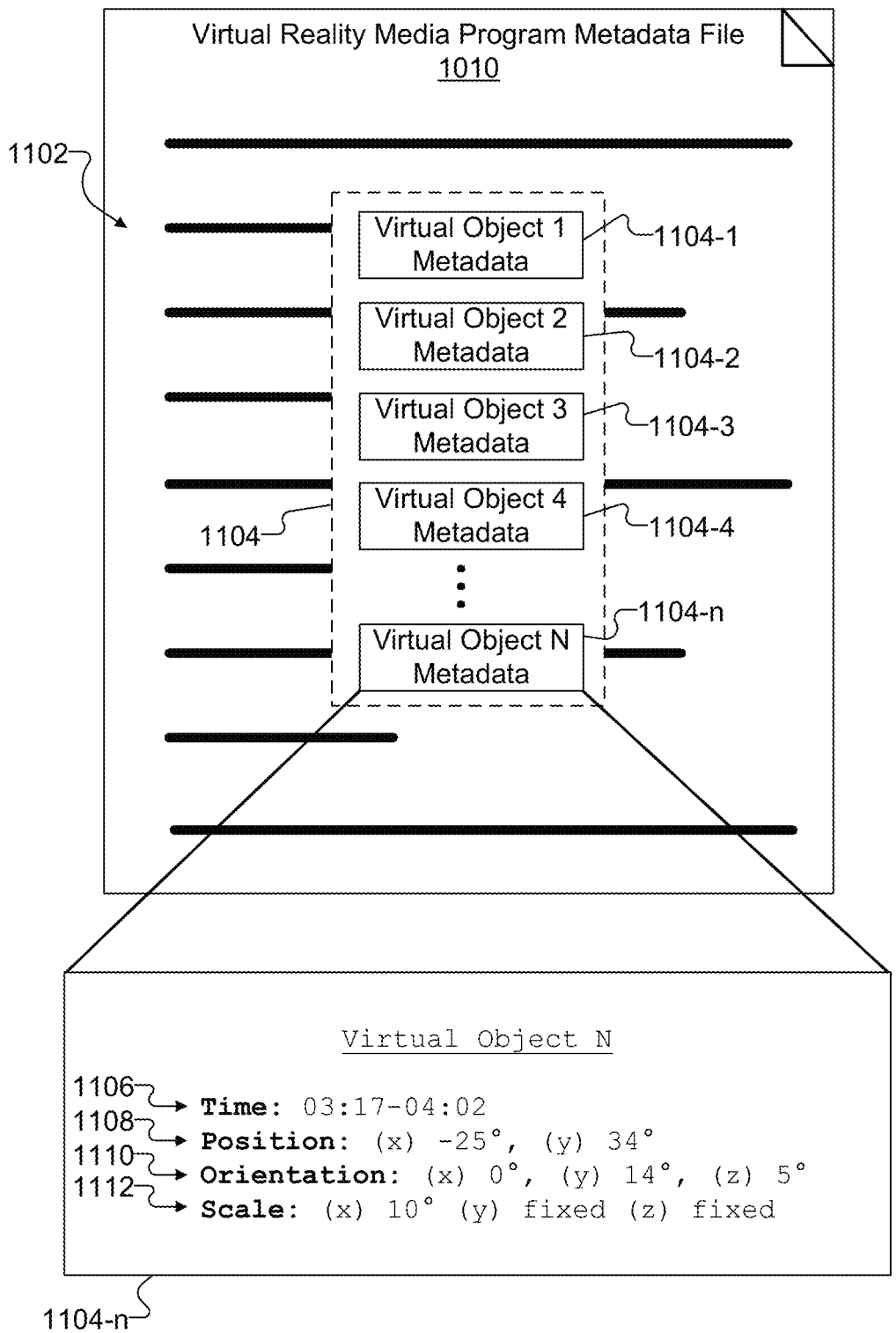
FIG. 11 illustrates an exemplary virtual reality media program metadata file according to principles described herein.

In other examples, metadata file 1010 may include metadata related to virtual objects that are dynamic and/or particular to the immersive virtual reality world, and that may be inserted at particular times and with particular display parameters into the immersive virtual reality world. To illustrate, FIG. 11 shows additional details for metadata file 1010 described above in relation to FIG. 10. As shown, metadata file 1010 may include data 1102 (e.g., textual data, metadata tags, markup code or other instructions, etc.) that may include metadata related to one or more virtual objects and/or commercial advertisements that have been or are to be inserted in the immersive virtual reality world. For example, as shown, metadata file 1010 may include data 1102 representative of virtual object metadata 1104. For example, as shown, virtual object metadata 1104 may include virtual object metadata 1104-1, which may describe display parameters for a first virtual object that may be associated with (e.g., acting primarily as a platform for) a particular commercial advertisement. Similarly, virtual object metadata 1104 may include virtual object metadata 1104-2 through 1104-$n$, which may described display parameters for other virtual objects that may be associated with other commercial advertisements. Along with virtual object metadata 1104, data 1102 may also include any other data (e.g., initialization data, metadata, advertising data, etc.) that backend system 1002 may transmit to media player device 1004 as may suit a particular implementation.

FIG. 11 further illustrates exemplary metadata that may be included within virtual object metadata 1104 (i.e., for the nth virtual object ("Virtual Object N") associated with virtual object metadata 1104-*n*). Specifically, as shown, virtual object metadata 1104-*n* may include a time parameter 1106 that may indicate a time at which Virtual Object N may be displayed within the immersive virtual reality world. For example, time parameter 1106 indicates that Virtual Object N may be displayed within the immersive virtual reality world beginning 3 minutes and 17 seconds into the presentation of the immersive virtual reality world and ending 4 minutes and 2 seconds into the presentation of the immersive virtual reality world.

Virtual object metadata 1104-*n* may further include display parameters related to Virtual Object N such as a positional parameter 1108, an orientation parameter 1110, and a scale parameter 1112. These display parameters may be related to the display parameters described above in relation to virtual object 606 in FIG. 6. For example, positional parameter 1108 may represent positional parameters 610 shown in FIG. 6, orientation parameter 1110 may represent orientational parameters 612 shown in FIG. 6, and scale parameter 1112 may represent scaling parameter 614 shown in FIG. 6.

As shown, positional parameter 1108 may include both x and y components, which may be expressed in degrees in relation to axes of the immersive virtual reality world (e.g., axes 604 in FIG. 6). While only x and y components are illustrated, it will be understood that fewer or additional components (e.g., including a z component) may be used to describe the position of Virtual Object N in particular implementations.

Moreover, orientation parameter 1110 may include x, y, and z components also expressed in degrees in relation to axes of the immersive virtual reality world. Fewer or additional components may be used to describe the orientation of Virtual Object N in particular implementations.

Similarly, as shown, scale parameter 1112 may include x, y, and z components. As described above in relation to scaling parameter 614, one component (e.g., the x component) may be configurable while other components (e.g., the y component and the z component) may be fixed based on the configurable component such that the relative proportions of Virtual Object N may remain constant. In certain examples, each of the components of scale parameter 1112 may be independently configurable. Additionally, fewer or additional components may be used to describe the scale of Virtual Object N in particular implementations.

Media player device 1004 may receive metadata file 1010 in response to request 1008 and may use metadata file 1010 to present a user-selected immersive virtual reality world for experiencing by a user. Media player device 1004 may use the data included in metadata file 1010 in any suitable way to present the immersive virtual reality world. For example, media player device 1004 may use virtual object metadata to determine one or more operations to perform to access and map a commercial advertisement onto a virtual object. For instance, media player device 1004 may use virtual object metadata to determine time and display parameters for a virtual object, access a commercial advertisement that matches parameters of the virtual object, and map the commercial advertisement to the virtual object in accordance with the parameters such that the commercial advertisement is viewable within the immersive virtual reality world at an appropriate time and location.

In certain examples, metadata file 1010 may include data indicating a source from which to access the commercial advertisement (e.g., data indicating an HTTP call to be made by media player device 1004 to access the commercial advertisement from a source at a particular URL address) and/or data indicating one or more parameters (e.g., keywords, tags, etc.) that may be used to generate a request for a commercial advertisement having certain attributes (e.g., promotional content suitable for and/or related to certain demographic groups and/or virtual reality content).

Figure 12:
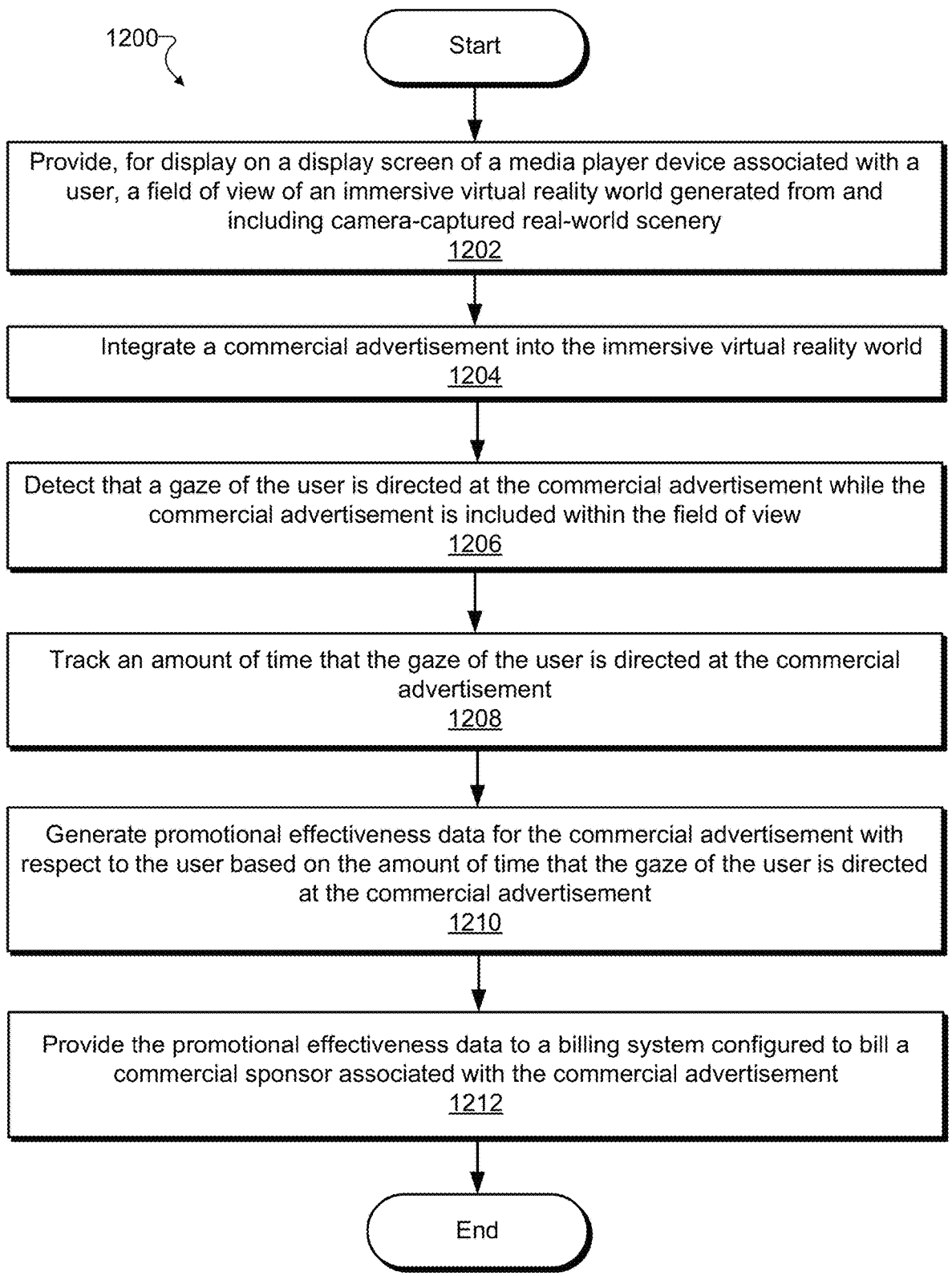
FIGS. 12 and 13 illustrate exemplary methods for determining an effectiveness of content in an immersive virtual reality world according to principles described herein.

FIG. 12 illustrates an exemplary method 1200 of determining an effectiveness of content in an immersive virtual reality world. In particular, method 1200 illustrates an exemplary way to determine promotional effectiveness of commercial advertisements in the immersive virtual reality world. While FIG. 12 illustrates exemplary operations according to one embodiment, other embodiments may omit, add to, reorder, and/or modify any of the operations shown in FIG. 12. One or more of the operations shown in FIG. 12 may be performed by system 400 and/or any implementation thereof.

In operation 1202, a virtual reality media system may provide, for display on a display screen of a media player device associated with a user, a field of view of an immersive virtual reality world. In some examples, the immersive virtual reality world may be generated from and may include camera-captured real-world scenery. Additionally, the field of view may include content of the immersive virtual reality world and may dynamically change in response to user input provided by the user as the user experiences the immersive virtual reality world. Operation 1202 may be performed in any of the ways described herein.

In operation 1204, the virtual reality media system may integrate a commercial advertisement into the immersive virtual reality world. Operation 1204 may be performed in any of the ways described herein.

In operation 1206, the virtual reality media system may detect that a gaze of the user is directed at the commercial advertisement while the commercial advertisement is included within the field of view. Operation 1206 may be performed in any of the ways described herein.

In operation 1208, the virtual reality media system may track an amount of time that the gaze of the user is directed at the commercial advertisement. In some examples, operation 1208 may be performed based on the detecting in operation 1206 that the gaze of the user is directed at the commercial advertisement. Operation 1208 may be performed in any of the ways described herein.

In operation 1210, the virtual reality media system may generate promotional effectiveness data for the commercial advertisement with respect to the user. In certain examples, the promotional effectiveness data may be generated based on the amount of time that the gaze of the user is directed at the commercial advertisement, as tracked during operation 1208. Operation 1210 may be performed in any of the ways described herein.

In operation 1212, the virtual reality media system may provide the promotional effectiveness data generated in operation 1210 to a billing system. The billing system may be configured to bill a commercial sponsor associated with the commercial advertisement based on the promotional effectiveness data. Operation 1212 may be performed in any of the ways described herein.

Figure 13:
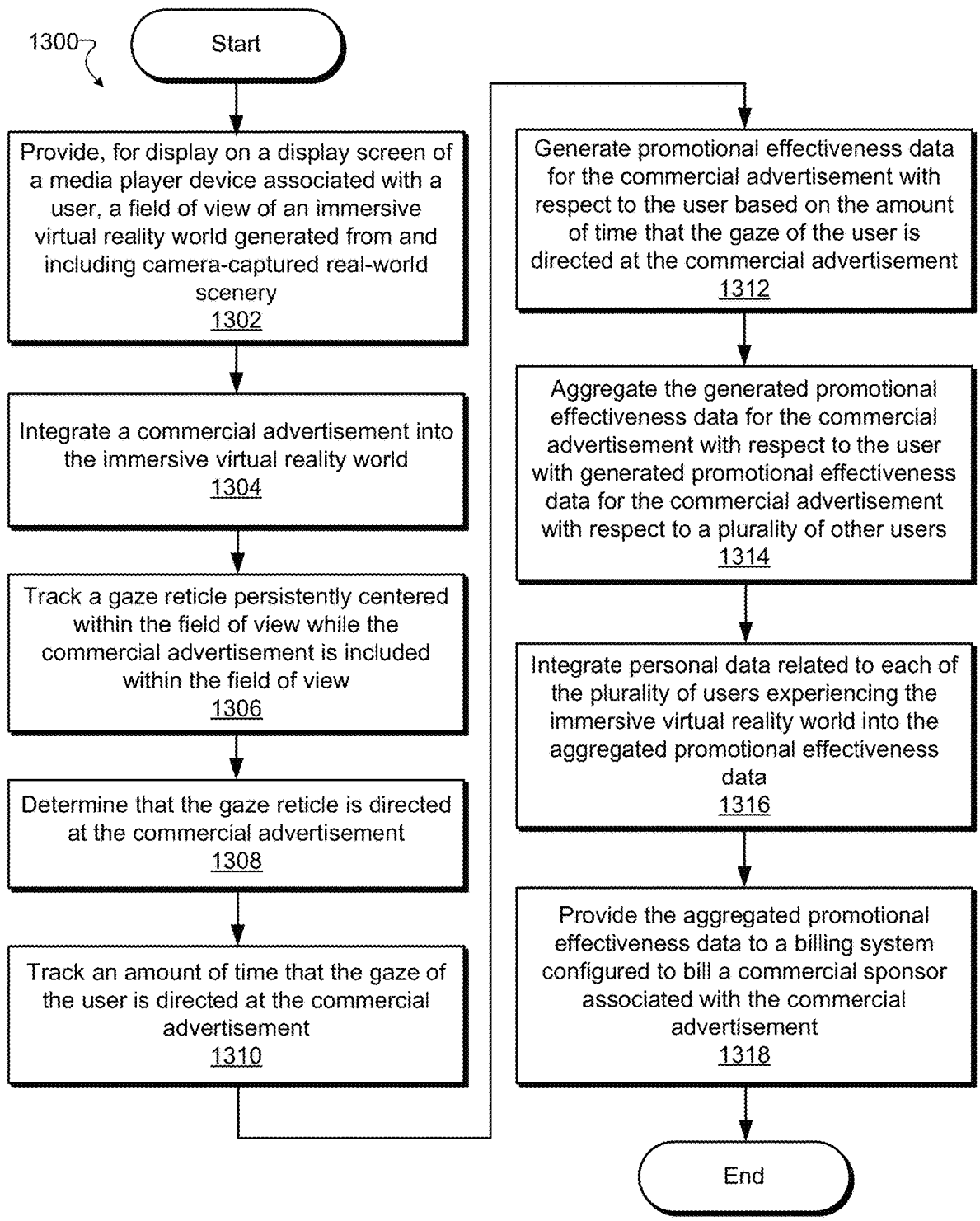

FIG. 13 illustrates an exemplary method 1300 of determining an effectiveness of content in an immersive virtual reality world. In particular, method 1300 illustrates an exemplary way to determine promotional effectiveness of commercial advertisements in the immersive virtual reality world. While FIG. 13 illustrates exemplary operations according to one embodiment, other embodiments may omit, add to, reorder, and/or modify any of the operations shown in FIG. 13. One or more of the operations shown in FIG. 13 may be performed by system 400 and/or any implementation thereof.

In operation 1302, a virtual reality media system may provide, for display on a display screen of a media player device associated with a user, a field of view of an immersive virtual reality world. In some examples, the immersive virtual reality world may be generated from and may include camera-captured real-world scenery. Additionally, the field of view may include content of the immersive virtual reality world and may dynamically change in response to user input provided by the user as the user experiences the immersive virtual reality world. Operation 1302 may be performed in any of the ways described herein.

In operation 1304, the virtual reality media system may integrate a commercial advertisement into the immersive virtual reality world. Operation 1304 may be performed in any of the ways described herein.

In operation 1306, the virtual reality media system may track a gaze reticle while the commercial advertisement is included within the field of view. In some examples, the gaze reticle may be persistently centered within the field of view with respect to at least one of a vertical dimension of the field of view and a horizontal dimension of the field of view. Operation 1306 may be performed in any of the ways described herein.

In operation 1308, the virtual reality media system may determine that the gaze reticle is directed at the commercial advertisement based on the tracking in operation 1306 of the gaze reticle. Operation 1308 may be performed in any of the ways described herein.

In operation 1310, the virtual reality media system may track an amount of time that the gaze of the user is directed at the commercial advertisement based on the determining in operation 1308 that the gaze reticle is directed at the commercial advertisement. Operation 1310 may be performed in any of the ways described herein.

In operation 1312, the virtual reality media system may generate promotional effectiveness data for the commercial advertisement with respect to the user. In some examples, the promotional effectiveness data may be generated based on the amount of time that the gaze of the user is directed at the commercial advertisement. Operation 1312 may be performed in any of the ways described herein.

In operation 1314, the virtual reality media system may aggregate the promotional effectiveness data for the commercial advertisement with respect to the user generated in operation 1312 with promotional effectiveness data for the commercial advertisement with respect to a plurality of other users. As such, operation 1314 may generate aggregated promotional effectiveness data for the commercial advertisement with respect to a plurality of users experiencing the immersive virtual reality world. The plurality of users experiencing the immersive virtual reality world may include both the user and the plurality of other users. Operation 1314 may be performed in any of the ways described herein.

In operation 1316, the virtual reality media system may integrate profile data related to each of the plurality of users experiencing the immersive virtual reality world into the aggregated promotional effectiveness data. Operation 1316 may be performed in any of the ways described herein.

In operation 1318, the virtual reality media system may provide the aggregated promotional effectiveness data to a billing system configured to bill a commercial sponsor based on the aggregated promotional effectiveness data. The commercial sponsor may be associated with the commercial advertisement. Operation 1318 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 14:
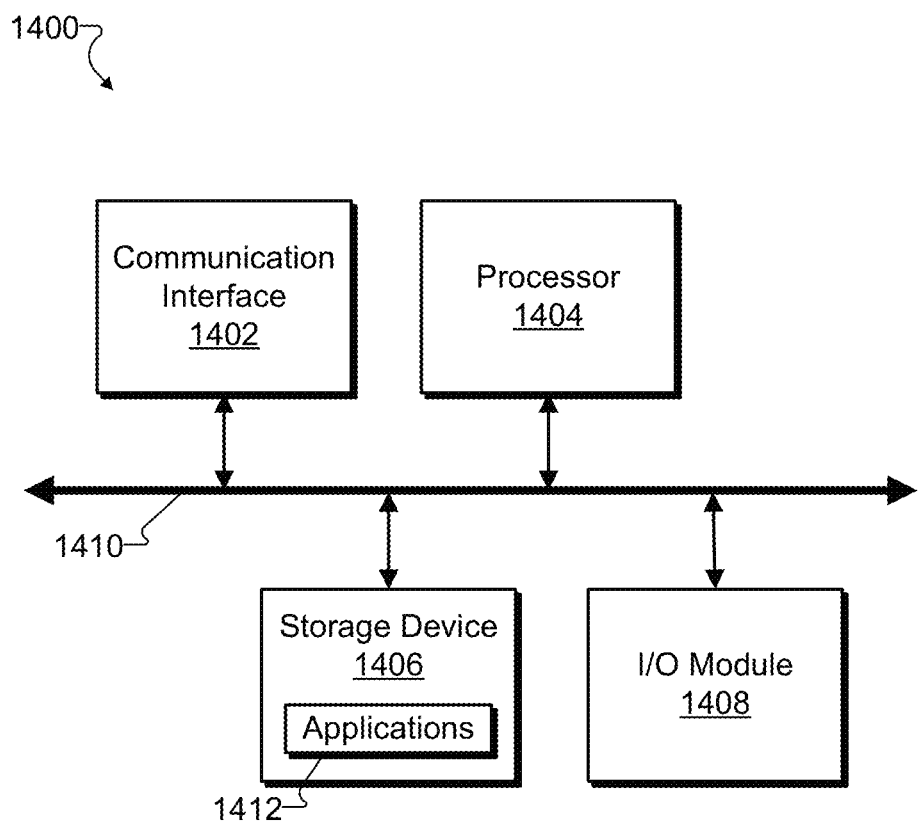
FIG. 14 illustrates an exemplary computing device according to principles described herein.

FIG. 14 illustrates an exemplary computing device 1400 that may be specifically configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may include one or more I/O modules configured to receive user input and provide user output. One or more I/O modules may be used to receive input for a single virtual reality experience. I/O module 1408 may include any hardware, firmware, software, or combination thereof supportive of input and output capabilities. For example, I/O module 1408 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with communication facility 402, advertisement integration facility 404, tracking facility 406, or virtual reality media content presentation facility 408 (see FIG. 4). Likewise, storage facility 410 may be implemented by or within storage device 1406.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. As another example, while certain examples described herein are directed to determining an effectiveness of a commercial advertisement included in an immersive virtual reality world, one or more principles described herein may be similarly applied (e.g., by system 400) to determine an effectiveness of other content (e.g., a non-sponsored virtual or real-world-scenery object included in the immersive virtual reality world.) The description and drawings are accordingly to be regarded in an illustrative rather than a restrictive sense.

What is claimed is:

1. A method comprising:

assigning, by a virtual reality media system, a plurality of display parameters to a three-dimensional ("3D") virtual object that includes a non-flat outer surface and is to be integrated into an immersive virtual reality world;

integrating, by the virtual reality media system in accordance with the assigned plurality of display parameters, the 3D virtual object into the immersive virtual reality world with real objects represented in the immersive virtual reality world, the real objects included within camera-captured real-world scenery from which the immersive virtual reality world is generated;

accessing, by the virtual reality media system based on the assigned plurality of display parameters, two-dimensional ("2D") content that is to be integrated into the immersive virtual reality world;

integrating, by the virtual reality media system in accordance with the assigned plurality of display parameters, the 2D content into the immersive virtual reality world by mapping the 2D content onto the non-flat outer surface of the 3D virtual object that has been integrated into the immersive virtual reality world with the real objects, the integrating of the 2D content performed in a manner to make the 2D content viewable as a skin of the 3D virtual object; and dynamically changing, by the virtual reality media system while the 2D content is integrated into the immersive virtual reality world, a display parameter of the plurality of display parameters so as to change at least one of a location, an orientation, or a size of the 3D virtual object to cause the 3D virtual object and the 2D content mapped onto the non-flat outer surface of the 3D virtual object to appear to the user to move or change within the immersive virtual reality world.

2. The method of claim 1, wherein the camera-captured real-world scenery from which the immersive virtual reality world is generated is separate from real-world scenery in an immediate vicinity of the user; and further comprising providing, by the virtual reality media system for display on a display screen of a media player device being used by the user, virtual reality media content representative of the immersive virtual reality world, the virtual reality media content depicting the camera-captured real-world scenery and not depicting the real-world scenery in the immediate vicinity of the user.

3. The method of claim 1, wherein the dynamic changing of the display parameter is performed by at least one of:
changing a positional parameter determinative of the location of the 3D virtual object to cause the 3D virtual object and the 2D content mapped onto the non-flat outer surface of the 3D virtual object to appear to the user to move within the immersive virtual reality world;
changing an orientational parameter determinative of the orientation of the 3D virtual object to cause the 3D virtual object and the 2D content mapped onto the non-flat outer surface of the 3D virtual object to appear to the user to rotate within the immersive virtual reality world; and
changing a scaling parameter determinative of the size of the 3D virtual object to cause the size of the 3D virtual object and the 2D content mapped onto the non-flat outer surface of the 3D virtual object to appear to the user to change within the immersive virtual reality world.

4. The method of claim 1, further comprising:
detecting, by the virtual reality media system while the 2D content is integrated into the immersive virtual reality world, that a gaze of the user is directed at the 2D content;
tracking, by the virtual reality media system based on the detecting, an amount of time that the gaze of the user is directed at the 2D content; and
generating, by the virtual reality media system, promotional effectiveness data for the 2D content with respect to the user based on the amount of time that the gaze of the user is directed at the 2D content.

5. The method of claim 1, wherein the 2D content mapped onto the non-flat outer surface of the 3D virtual object includes a still image.

6. The method of claim 1, wherein the 2D content mapped onto the non-flat outer surface of the 3D virtual object includes at least one of an animated image and a video.

7. The method of claim 1, wherein the 2D content is interactive 2D content configured to change from a 2D banner to a 2D video presentation when the user is detected to gaze at the 2D content for a predetermined length of time.

8. The method of claim 1, embodied as computer-executable instructions on at least one non-transitory computer-readable medium.

9. The method of claim 1, wherein the 2D content mapped onto the non-flat outer surface of the 3D virtual object is promotional content including a 2D commercial advertisement.

10. A method comprising:
assigning, by a virtual reality media system, a plurality of display parameters to a three-dimensional ("3D") virtual object that includes a non-flat outer surface and is to be integrated into an immersive virtual reality world;
integrating, by the virtual reality media system and in accordance with the assigned plurality of display parameters, the 3D virtual object into the immersive virtual reality world with real objects represented in the immersive virtual reality world, the real objects included within camera-captured real-world scenery from which the immersive virtual reality world is generated;
dynamically changing, by the virtual reality media system, at least one of a positional parameter included in the plurality of display parameters and determinative of a location of the 3D virtual object to cause the 3D virtual object to appear to the user to move within the immersive virtual reality world,
an orientational parameter included in the plurality of display parameters and determinative of an orientation of the 3D virtual object to cause the 3D virtual object to appear to the user to rotate within the immersive virtual reality world, or
a scaling parameter included in the plurality of display parameters and determinative of a size of the 3D virtual object to cause the size of the 3D virtual object to appear to the user to change within the immersive virtual reality world;
accessing, by the virtual reality media system based on the assigned plurality of display parameters, two-dimensional ("2D") content that is to be integrated into the immersive virtual reality world;
integrating, by the virtual reality media system, the 2D content into the immersive virtual reality world by mapping the 2D content onto the non-flat outer surface of the 3D virtual object that has been integrated into the immersive virtual reality world with the real objects, the integrating of the 2D content performed in a manner to make the 2D content viewable as a skin of the 3D virtual object and to make the 2D content appear to the user to move or change in accordance with the move or change of the 3D virtual object while the at least one of the positional parameter, the orientational parameter, and or the scaling parameter is dynamically changing;
detecting, by the virtual reality media system while the 2D content is integrated into the immersive virtual reality world, that a gaze of the user is directed at the 2D content;
tracking, by the virtual reality media system based on the detecting, an amount of time that the gaze of the user is directed at the 2D content; and
generating, by the virtual reality media system, promotional effectiveness data for the 2D content with respect to the user based on the amount of time that the gaze of the user is directed at the 2D content.

11. The method of claim 10, wherein the camera-captured real-world scenery from which the immersive virtual reality world is generated is separate from real-world scenery in an immediate vicinity of the user; and
further comprising providing, by the virtual reality media system for display on a display screen of a media player device being used by the user, virtual reality media content representative of the immersive virtual reality world, the virtual reality media content depicting the camera-captured real-world scenery and not depicting the real-world scenery in the immediate vicinity of the user.

12. The method of claim 10, embodied as computer-executable instructions on at least one non-transitory computer-readable medium.

13. The method of claim 10, wherein the 2D content is interactive 2D content configured to change from a 2D banner to a 2D video presentation when the user is detected to gaze at the 2D content for a predetermined length of time.

14. A system comprising:
at least one physical computing device that
assigns a plurality of display parameters to a three-dimensional ("3D") virtual object that includes a non-flat outer surface and is to be integrated into an immersive virtual reality world;

integrates, and in accordance with the assigned plurality of display parameters, the 3D virtual object into the immersive virtual reality world with real objects represented in the immersive virtual reality world, the real objects included within camera-captured real-world scenery from which the immersive virtual reality world is generated;

accesses, based on the assigned plurality of display parameters, two-dimensional ("2D") content that is to be integrated into the immersive virtual reality world;

integrates, in accordance with the assigned plurality of display parameters, the 2D content into the immersive virtual reality world by mapping the 2D content onto the non-flat outer surface of the 3D virtual object that has been integrated into the immersive virtual reality world with the real objects, the integrating of the 2D content performed in a manner to make the 2D content viewable as a skin of the 3D virtual object; and dynamically changes, while the 2D content is integrated into the immersive virtual reality world, a display parameter of the plurality of display parameters so as to change at least one of a location, an orientation, or a size of the 3D virtual object to cause the 3D virtual object and the 2D content mapped onto the non-flat outer surface of the 3D virtual object to appear to the user to move or change within the immersive virtual reality world.

15. The system of claim 14, wherein the camera-captured real-world scenery from which the immersive virtual reality world is generated is separate from real-world scenery in an immediate vicinity of the user; and the at least one physical computing device further provides, for display on a display screen of a media player device being used by the user, virtual reality media content representative of the immersive virtual reality world, the virtual reality media content depicting the camera-captured real-world scenery and not depicting the real-world scenery in the immediate vicinity of the user.

16. The system of claim 14, wherein the at least one physical computing device performs the dynamic changing of the display parameter by at least one of:

changing a positional parameter determinative of the location of the 3D virtual object to cause the 3D virtual object and the 2D content mapped onto the non-flat outer surface of the 3D virtual object to appear to the user to move within the immersive virtual reality world;

changing an orientational parameter determinative of the orientation of the 3D virtual object to cause the 3D virtual object and the 2D content mapped onto the non-flat outer surface of the 3D virtual object to appear to the user to rotate within the immersive virtual reality world; and changing a scaling parameter determinative of the size of the 3D virtual object to cause the size of the 3D virtual object and the 2D content mapped onto the non-flat outer surface of the 3D virtual object to appear to the user to change within the immersive virtual reality world.

17. The system of claim 14, wherein the at least one physical computing device further:

detects, while the 2D content is integrated into the immersive virtual reality world, that a gaze of the user is directed at the 2D content;

tracks, based on the detection, an amount of time that the gaze of the user is directed at the 2D content; and generates promotional effectiveness data for the 2D content with respect to the user based on the amount of time that the gaze of the user is directed at the 2D content.

18. The system of claim 14, wherein the 2D content mapped onto the non-flat outer surface of the 3D virtual object includes at least one of a still image, an animated image, and a video.

19. The system of claim 14, wherein the 2D content mapped onto the non-flat outer surface of the 3D virtual object is promotional content including a 2D commercial advertisement.

20. The system of claim 14, wherein the 2D content is interactive 2D content configured to change from a 2D banner to a 2D video presentation when the user is detected to gaze at the 2D content for a predetermined length of time.

* * * * *